United States Patent
Finn

(10) Patent No.: US 11,113,593 B2
(45) Date of Patent: Sep. 7, 2021

(54) CONTACTLESS METAL CARDS WITH FINGERPRINT SENSOR AND DISPLAY

(71) Applicant: Federal Card Services, LLC, Cincinnati, OH (US)

(72) Inventor: David Finn, Füssen Weissensee (DE)

(73) Assignee: Federal Card Services; LLC, Cincinnati, OH (US)

( * ) Notice: Subject to any disclaimer, the term of this patent is extended or adjusted under 35 U.S.C. 154(b) by 0 days.

(21) Appl. No.: 16/994,558

(22) Filed: Aug. 15, 2020

(65) Prior Publication Data

US 2021/0049439 A1 Feb. 18, 2021

Related U.S. Application Data

(63) Continuation-in-part of application No. 16/991,136, filed on Aug. 12, 2020.
(Continued)

(51) Int. Cl.
*G06K 19/077* (2006.01)
*G06K 19/073* (2006.01)

(52) U.S. Cl.
CPC . *G06K 19/07773* (2013.01); *G06K 19/07354* (2013.01)

(58) Field of Classification Search
CPC ....... G06K 19/07773; G06K 19/07354; G06K 19/07771; G06K 19/07769; G06K 19/07784
See application file for complete search history.

(56) References Cited

U.S. PATENT DOCUMENTS

| | | |
|---|---|---|
| 5,413,814 A | 5/1995 | Bowen et al. |
| 6,019,268 A | 2/2000 | Melzer et al. |

(Continued)

FOREIGN PATENT DOCUMENTS

| | | |
|---|---|---|
| CN | 205158409 U | 4/2016 |
| EP | 2372840 | 9/2013 |

(Continued)

OTHER PUBLICATIONS

Ackland et al. ("Use of slits of defined width in metal layers within ID-1 cards, as reactive couplers for near-field passive RFID at 13.56 MHz," 2016 IEEE International Conference on RFID (RFID), 2016, pp. 1-4, doi: 10.1109/RFID.2016.7488005) (Year: 2016).*

(Continued)

*Primary Examiner* — Seung H Lee
(74) *Attorney, Agent, or Firm* — Gerald E Linde

(57) ABSTRACT

Smartcards (SC) having a metal layer (ML) or metal card body (MCB) and a module opening (MO) for a transponder chip module (TCM). A slit (S) or notch (N) in the metal card body may extend from a peripheral edge of a metal layer or card body, without extending to the module opening. A flexible circuit (FC) with one or two patch antennae (PA) or sense coils (SeC) connected to a coupling loop structure (CLS) with an antenna structure (AS) on the same substrate may be incorporated into the card body (CB). A fingerprint sensing module comprising an electrically-conductive metal bezel housed in the card may be electrically isolated from the metal layer or metal card body by the application of coatings (DLC) or anodizing (oxidizing) the respective metal surfaces. The cards may be contactless only, contact only, or dual-interface (contact and contactless).

17 Claims, 12 Drawing Sheets

(FIG. 3 of US 9,836,684)

Related U.S. Application Data

(60) Provisional application No. 63/053,559, filed on Jul. 17, 2020, provisional application No. 63/040,544, filed on Jun. 18, 2020, provisional application No. 63/040,033, filed on Jun. 17, 2020, provisional application No. 63/035,670, filed on Jun. 5, 2020, provisional application No. 63/034,965, filed on Jun. 4, 2020, provisional application No. 63/031,571, filed on May 29, 2020, provisional application No. 63/014,142, filed on Apr. 23, 2020, provisional application No. 62/986,612, filed on Mar. 6, 2020, provisional application No. 62/981,040, filed on Feb. 25, 2020, provisional application No. 62/979,422, filed on Feb. 21, 2020, provisional application No. 62/978,826, filed on Feb. 20, 2020, provisional application No. 62/971,927, filed on Feb. 8, 2020, provisional application No. 62/969,034, filed on Feb. 1, 2020, provisional application No. 62/960,178, filed on Jan. 13, 2020, provisional application No. 62/936,519, filed on Nov. 17, 2019, provisional application No. 62/912,701, filed on Oct. 9, 2019, provisional application No. 62/894,976, filed on Sep. 3, 2019, provisional application No. 62/891,433, filed on Aug. 26, 2019, provisional application No. 62/891,308, filed on Aug. 24, 2019, provisional application No. 62/889,055, filed on Aug. 20, 2019, provisional application No. 62/889,555, filed on Aug. 20, 2019, provisional application No. 62/888,539, filed on Aug. 18, 2019, provisional application No. 62/887,696, filed on Aug. 16, 2019, provisional application No. 62/886,978, filed on Aug. 15, 2019.

(56) References Cited

U.S. PATENT DOCUMENTS

| | | |
|---|---|---|
| 6,139,664 A | 10/2000 | Melzer et al. |
| D436,620 S | 1/2001 | Webb et al. |
| D438,562 S | 3/2001 | Webb et al. |
| D438,563 S | 3/2001 | Webb et al. |
| 6,214,155 B1 | 4/2001 | Leighton |
| D442,222 S | 5/2001 | Webb et al. |
| D442,627 S | 5/2001 | Webb et al. |
| D442,628 S | 5/2001 | Webb et al. |
| D442,629 S | 5/2001 | Webb et al. |
| D443,298 S | 6/2001 | Webb et al. |
| D447,515 S | 9/2001 | Faenza, Jr. et al. |
| D449,336 S | 10/2001 | Webb et al. |
| 6,378,774 B1 | 4/2002 | Emori et al. |
| 6,452,563 B1 | 9/2002 | Porte |
| 6,491,229 B1 | 12/2002 | Berney |
| 6,581,839 B1 | 6/2003 | Lasch et al. |
| 6,656,541 B1 | 12/2003 | Archer et al. |
| 6,669,813 B1 | 12/2003 | Melzer et al. |
| 6,749,123 B2 | 6/2004 | Lasch et al. |
| 6,764,014 B2 | 7/2004 | Lasch et al. |
| 6,843,422 B2 | 1/2005 | Jones et al. |
| D507,298 S | 7/2005 | Allard et al. |
| D507,598 S | 7/2005 | Allard et al. |
| D508,261 S | 8/2005 | Allard et al. |
| D510,103 S | 9/2005 | Allard et al. |
| D512,095 S | 11/2005 | Allard et al. |
| D523,471 S | 6/2006 | Allard et al. |
| D525,298 S | 7/2006 | Allard et al. |
| D525,653 S | 7/2006 | Allard et al. |
| D525,654 S | 7/2006 | Allard et al. |
| D526,013 S | 8/2006 | Allard et al. |
| D526,014 S | 8/2006 | Allard et al. |
| D526,015 S | 8/2006 | Allard et al. |
| D526,016 S | 8/2006 | Allard et al. |
| D527,421 S | 8/2006 | Allard et al. |
| D529,955 S | 10/2006 | Allard et al. |
| 7,207,494 B2 | 4/2007 | Theodossiou et al. |
| 7,278,580 B2 | 10/2007 | Jones et al. |
| 7,287,704 B2 | 10/2007 | Herslow |
| 7,306,158 B2 | 12/2007 | Berardi et al. |
| 7,306,163 B2 | 12/2007 | Scholz et al. |
| D569,423 S | 5/2008 | Lasch et al. |
| 7,377,443 B2 | 5/2008 | Lasch et al. |
| 7,381,355 B2 | 6/2008 | Rawlins et al. |
| D572,305 S | 7/2008 | Lasch et al. |
| D578,569 S | 10/2008 | Lasch et al. |
| D579,044 S | 10/2008 | Lasch et al. |
| 7,494,057 B2 | 2/2009 | Lasch et al. |
| 7,530,491 B2 | 5/2009 | Lasch et al. |
| D593,600 S | 6/2009 | Lasch et al. |
| 7,544,266 B2 | 6/2009 | Herring et al. |
| 7,607,583 B2 | 10/2009 | Berardi et al. |
| 7,819,310 B2 | 10/2010 | Lasch et al. |
| 7,823,777 B2 | 11/2010 | Varga et al. |
| 7,837,116 B2 | 11/2010 | Webb et al. |
| 7,971,786 B2 | 7/2011 | Lasch et al. |
| 8,033,457 B2 | 10/2011 | Varga et al. |
| 8,066,190 B2 | 11/2011 | Faenza, Jr. |
| 8,079,514 B2 | 12/2011 | Lasch et al. |
| 8,100,337 B2 | 1/2012 | Artigue et al. |
| 8,186,582 B2 | 5/2012 | Varga et al. |
| 8,186,598 B2 | 5/2012 | Faenza, Jr. |
| 8,393,547 B2 | 3/2013 | Kiekhaefer et al. |
| 8,448,872 B2 | 5/2013 | Droz |
| 8,490,872 B2 | 7/2013 | Kim |
| 8,523,062 B2 | 9/2013 | Varga et al. |
| 8,608,082 B2 | 12/2013 | Le Garrec et al. |
| 8,672,232 B2 | 3/2014 | Herslow |
| 8,702,328 B2 | 4/2014 | Cronin et al. |
| 8,737,915 B2 | 5/2014 | Beenken |
| 8,756,680 B2 * | 6/2014 | Shashidhar ........ G06K 19/0718 726/20 |
| 8,777,116 B2 | 6/2014 | Lin |
| 8,823,497 B2 * | 9/2014 | Hutzler ............ G06K 9/00892 340/10.51 |
| 8,931,691 B2 | 1/2015 | Manessis et al. |
| 8,976,075 B2 | 3/2015 | Kato et al. |
| 9,024,763 B2 | 5/2015 | Hamedani |
| 9,033,250 B2 | 5/2015 | Finn et al. |
| 9,203,157 B2 | 12/2015 | Kato et al. |
| 9,269,032 B2 | 2/2016 | Zlotnik et al. |
| 9,272,370 B2 | 3/2016 | Finn et al. |
| 9,299,020 B2 | 3/2016 | Zimmerman et al. |
| D756,317 S | 5/2016 | Finn et al. |
| 9,390,360 B1 | 7/2016 | Yang et al. |
| 9,390,363 B1 | 7/2016 | Herslow et al. |
| 9,390,364 B2 | 7/2016 | Finn et al. |
| 9,390,366 B1 | 7/2016 | Herslow |
| 9,475,086 B2 | 10/2016 | Finn et al. |
| 9,489,613 B2 | 11/2016 | Finn et al. |
| 9,542,635 B2 | 1/2017 | Herslow |
| 9,564,678 B2 | 2/2017 | Kato et al. |
| 9,622,359 B2 | 4/2017 | Finn et al. |
| 9,634,391 B2 | 4/2017 | Finn et al. |
| 9,697,459 B2 | 7/2017 | Finn et al. |
| 9,721,200 B2 | 8/2017 | Herslow |
| 9,727,759 B1 | 8/2017 | Essebag et al. |
| 9,760,816 B1 | 9/2017 | Williams et al. |
| 9,798,968 B2 | 10/2017 | Finn et al. |
| 9,812,782 B2 | 11/2017 | Finn et al. |
| 9,836,684 B2 | 12/2017 | Finn et al. |
| 9,836,687 B1 | 12/2017 | Williams et al. |
| 9,892,405 B2 | 2/2018 | Olson et al. |
| 9,898,699 B2 | 2/2018 | Herslow et al. |
| 9,960,476 B2 | 5/2018 | Finn et al. |
| 10,032,169 B2 | 7/2018 | Essebag et al. |
| 10,089,570 B2 | 10/2018 | Herslow et al. |
| 10,140,569 B2 * | 11/2018 | Kim ................ G06K 19/07722 |
| 10,160,247 B2 | 12/2018 | Beech |
| 10,193,211 B2 | 1/2019 | Finn et al. |
| 10,248,902 B1 | 4/2019 | Finn et al. |
| 10,262,258 B2 | 4/2019 | Beech et al. |
| 10,268,942 B2 * | 4/2019 | Lalo ................ H01L 23/49855 |
| 10,275,703 B2 | 4/2019 | Herslow et al. |
| 10,289,944 B2 | 5/2019 | Herslow et al. |

(56) References Cited

U.S. PATENT DOCUMENTS

| | | |
|---|---|---|
| 10,311,346 B2 | 6/2019 | Herslow |
| 10,318,859 B2 | 6/2019 | Lowe et al. |
| 10,325,135 B2 | 6/2019 | Andersen et al. |
| 10,332,846 B2 | 6/2019 | Herslow |
| 10,373,920 B2 | 8/2019 | Herslow |
| 10,395,153 B2 | 8/2019 | Herslow |
| 10,395,164 B2 | 8/2019 | Lundberg et al. |
| 10,406,734 B2 | 9/2019 | Lowe |
| 10,445,636 B2 | 10/2019 | Virostek et al. |
| 10,507,677 B2 | 12/2019 | Wooldridge et al. |
| 10,518,518 B2 | 12/2019 | Finn et al. |
| 10,534,990 B2 | 1/2020 | Herslow et al. |
| 10,583,594 B2 | 3/2020 | Lowe |
| 10,583,683 B1 | 3/2020 | Ridenour et al. |
| 10,599,972 B2 | 3/2020 | Finn et al. |
| 10,552,722 B2 | 10/2020 | Finn et al. |
| 2005/0003297 A1 | 1/2005 | Labrec |
| 2005/0040243 A1 | 2/2005 | Daoshen et al. |
| 2005/0095408 A1 | 5/2005 | Labrec et al. |
| 2011/0181486 A1 | 7/2011 | Kato |
| 2012/0112971 A1 | 5/2012 | Takeyama et al. |
| 2013/0126622 A1 | 5/2013 | Finn |
| 2014/0091149 A1 | 4/2014 | Finn et al. |
| 2014/0231503 A1 | 8/2014 | Kunitaka |
| 2014/0279555 A1 | 9/2014 | Guillaud |
| 2014/0284386 A1 | 9/2014 | Finn et al. |
| 2014/0361086 A1 | 12/2014 | Finn et al. |
| 2015/0021403 A1 | 1/2015 | Finn et al. |
| 2015/0129665 A1 | 5/2015 | Finn et al. |
| 2015/0206047 A1 | 7/2015 | Herslow et al. |
| 2015/0269477 A1 | 9/2015 | Finn et al. |
| 2016/0110639 A1 | 4/2016 | Finn et al. |
| 2016/0148194 A1 | 5/2016 | Guillaud et al. |
| 2016/0257019 A1 | 9/2016 | Melzer et al. |
| 2018/0005064 A1 | 1/2018 | Vogel et al. |
| 2018/0341846 A1 | 3/2018 | Finn et al. |
| 2018/0204105 A1* | 7/2018 | Herslow ........... G06K 19/07722 |
| 2018/0339503 A1 | 11/2018 | Finn et al. |
| 2018/0341847 A1 | 11/2018 | Finn et al. |
| 2018/0349751 A1 | 12/2018 | Herslow et al. |
| 2019/0050706 A1 | 2/2019 | Lowe |
| 2019/0073578 A1 | 3/2019 | Lowe et al. |
| 2019/0102662 A1 | 4/2019 | Snell et al. |
| 2019/0114526 A1 | 4/2019 | Finn et al. |
| 2019/0156994 A1 | 5/2019 | Cox |
| 2019/0160717 A1 | 5/2019 | Lowe |
| 2019/0171923 A1 | 6/2019 | Finn |
| 2019/0197386 A1 | 6/2019 | Finn et al. |
| 2019/0236434 A1 | 8/2019 | Lowe |
| 2019/0251322 A1 | 8/2019 | Slogedal et al. |
| 2019/0251411 A1 | 8/2019 | Gire et al. |
| 2019/0286961 A1 | 9/2019 | Lowe |
| 2019/0291316 A1 | 9/2019 | Lowe |
| 2019/0311235 A1 | 10/2019 | Sexl et al. |
| 2019/0311236 A1 | 10/2019 | Sexl et al. |
| 2019/0332907 A1 | 10/2019 | Herslow |
| 2019/0384261 A1 | 12/2019 | Nam et al. |
| 2020/0034578 A1 | 1/2020 | Finn et al. |
| 2020/0151534 A1 | 5/2020 | Lotya et al. |
| 2020/0164675 A1 | 5/2020 | Ridenour et al. |

FOREIGN PATENT DOCUMENTS

| | | |
|---|---|---|
| KR | 10-1754985 | 6/2017 |
| WO | WO 2016/046184 | 3/2016 |
| WO | WO 2017/090891 | 6/2017 |
| WO | WO 2017/198842 | 11/2017 |
| WO | WO 2019/173455 | 9/2019 |

OTHER PUBLICATIONS

A Metallic RFID Tag Design for Steel-Bar and Wire-Rod Management Application in the Steel Industry, Chen, S.L., Kuo, S.K. and Lin C.T., Progress In Electromagnetics Research, PIER 91, pp. 195-212, 2009.

T900306, Cast Modified Epoxy Adhesive, GTS Flexible Materials, Feb. 13, 2019, 2pp.

DEVT-008-20, Epoxy Adhesive Pen Tapes, GTS Flexible Materials, Jan. 9, 2020, 2pp.

International Search Report and Written Opinion for PCT/US20/46565, dated Feb. 9, 2021.

* cited by examiner (FIG. 3 of US 9,836,684)

1

CONTACTLESS METAL CARDS WITH FINGERPRINT SENSOR AND DISPLAY

CROSS-REFERENCES TO RELATED APPLICATIONS

Priority (filing date benefit) is claimed from the following, incorporated by reference herein:

This application is a continuation-in-part of U.S. Ser. No. 16/991,136 filed 12 Aug. 2020

This application is:
a nonprovisional of 63/053,559 filed 17 Jul. 2020
a nonprovisional of 63/040,544 filed 18 Jun. 2020
a nonprovisional of 63/040,033 filed 17 Jun. 2020
a nonprovisional of 63/035,670 filed 5 Jun. 2020
a nonprovisional of 63/034,965 filed 4 Jun. 2020
a nonprovisional of 63/031,571 filed 29 May 2020
a nonprovisional of 63/014,142 filed 23 Apr. 2020
a nonprovisional of 62/986,612 filed 6 Mar. 2020
a nonprovisional of 62/981,040 filed 25 Feb. 2020
a nonprovisional of 62/979,422 filed 21 Feb. 2020
a nonprovisional of 62/978,826 filed 20 Feb. 2020
a nonprovisional of 62/971,927 filed 8 Feb. 2020
a nonprovisional of 62/969,034 filed 1 Feb. 2020
a nonprovisional of 62/960,178 filed 13 Jan. 2020
a nonprovisional of 62/936,519 filed 17 Nov. 2019
a nonprovisional of 62/912,701 filed 9 Oct. 2019
a nonprovisional of 62/894,976 filed 3 Sep. 2019
a nonprovisional of 62/891,433 filed 26 Aug. 2019
a nonprovisional of 62/891,308 filed 24 Aug. 2019
a nonprovisional of 62/889,555 filed 20 Aug. 2019
a nonprovisional of 62/889,055 filed 20 Aug. 2019
a nonprovisional of 62/888,539 filed 18 Aug. 2019
a nonprovisional of 62/887,696 filed 16 Aug. 2019
a nonprovisional of 62/886,978 filed 15 Aug. 2019

TECHNICAL FIELD

This disclosure relates to RFID-enabled (or "contactless" capable) smartcards ("cards"), such as metal transaction cards and, more particularly, to cards with fingerprint sensors and/or displays. The disclosure also relates to passive metal cards harvesting energy to power on-board electronic devices or components from an external (ambient) electromagnetic field.

This disclosure relates to RFID-enabled (or "contactless" capable) smartcards ("cards), such as metal transaction cards and, more particularly, to cards having biometric (such as fingerprint sensing) capability and/or a display such as for displaying a CVV (credit card security code) value. The disclosure may also relate to cards having coupling frames which do not have slits.

The disclosure may relate broadly to passive RFID-enabled metal transaction cards including "metal smartcards" such as encapsulated metal smartcards (aka encased metal cards), metal core smartcards (aka embedded metal or metal veneer smartcards—plastic front, edge to edge metal core, plastic back), metal face smartcards (aka metal hybrid cards—metal front, plastic back), full metal smartcards, and biometric metal smartcards, having an RFID chip (IC) capable of operating in a "contactless" mode (ISO 14443 or NFC/ISO 15693), including dual interface (DI) metal smartcards and metal payment objects (or "metal payment devices") which can also operate in "contact" mode (ISO 7816-2). Some of the disclosure(s) herein may relate to metal smartcards having only a contactless interface.

The disclosure(s) herein may further relate to biometric transaction cards and smartcards with a dynamic display.

Some of the disclosure(s) herein may relate to RFID-enabled metal transaction cards having only a contact interface, or having only a contactless interface, or having dual interface (DI; contact and contactless).

BACKGROUND

Passive dual interface smartcards with a metal layer (ML) or metal card body (MCB) having a slit (S) and a module opening (MO) to accommodate a transponder chip module (TCM) or an inductive coupling chip module (ICM) (6 or 8 pin package) is known in the smartcard industry. The metal layer (ML) or metal card body (MCB) with a slit (S) extending from a perimeter edge to a module opening (MO), so as to function as a coupling frame (CF), requires that the module antenna (MA) of the transponder chip module (TCM) overlaps at least a portion of the metal within the area of the module opening (MO). In other words, the turns or windings of the module antenna (MA) on the face-down side or rear side of the transponder chip module (having contact pads on the face-up side) must overlap at very close range the metal layer in the module opening to enable contactless communication when the smartcard is in an electromagnetic field generated by a reader or point of sale terminal.

The transponder chip module (TCM) comprises a module antenna (MA) with a certain number of turns or windings electrically connected on the module tape (MT) to the antenna bonding pads $L_A$ and $L_B$ of the RFID chip (IC). In a wearable payment device made of metal, according to the prior art, the transponder chip module does not have contact pads, and the module antenna overlaps the slit or discontinuity which begins at a perimeter edge of the metal and extends across the metal housing forming an integral part of the wearable device.

The integration of a booster antenna (BA), compensating loop (CL), discontinuous metal frame (DMF) and coupling frame (CF) in smartcards to amplify the RF signal for inductive coupling with the module antenna (MA) of a transponder chip module (TCM), as well as the alternative approach of physically connecting an in-card antenna to the connection pads on a chip module without a module antenna is well documented, and sets the stage for the next generation of contact and contactless transaction cards with multiple components and sensors.

Generally, in the prior art, a coupling frame comprises a metal layer (ML) or metal card body (MCB) having a slit (S) extending from a peripheral edge of the metal layer or metal card body to an opening (MO) for receiving a transponder chip module (TCM) comprising an RFID chip (IC) and a module antenna (MA), for enabling a contactless interface. A dual-interface module may also have contact pads (CP) for enabling a contact interface.

The prior art, however, does not disclose a metal layer (ML) or metal card body (MCB) without a slit (S) acting as a coupling frame (CF), to drive a transponder chip module (TCM). In previous representations of RFID slit technology, the transponder chip module comprises an RFID chip connected to a module antenna on the same substrate. In previous representations of dual interface (contact and contactless) smartcards, the slit always extends from a perimeter edge of the metal layer or metal card body to a module opening (MO), without considering that the slit may not need to extend to the module opening in order to enable the metal layer or metal card body to operate as a coupling frame. Distribution of surface currents from different locations on a metal card body is not acknowledged by the prior art, and that such locations could individually drive an electronic component.

In the prior art directed to passive smartcards, a booster antenna (BA) in the card body (CB), or the combination of a coupling frame (CF) and the module antenna (MA) are used to harvest energy for powering electronic components of the card (such as the TCM).

The prior art, however, does not disclose the use of a flexible circuit (FC) with an antenna structure, to pick-up surface current from a discontinuity in a metal layer or a metal card body, and to direct the harvested current to a discrete component or any electronic device.

Some Definitions

Some of the following terms may be used or referred to, herein. Some may relate to background or general knowledge, others may relate to the invention(s) disclosed herein.

Eddy Currents

Eddy currents are induced electrical currents that flow in a circular path. In other words, they are closed loops of induced current circulating in planes perpendicular to the magnetic flux. Eddy currents concentrate near the surface adjacent to the excitation coil of the contactless reader generating the electromagnetic field, and their strength decreases with distance from the transmitter coil. Eddy current density decreases exponentially with depth. This phenomenon is known as the skin effect. The depth that eddy currents penetrate into a metal object is affected by the frequency of the excitation current and the electrical conductivity and magnetic permeability of the metal.

Skin Depth

Skin effect is the tendency of an alternating electric current (AC) to become distributed within a conductor such that the current density is largest near the surface of the conductor, and decreases with greater depths in the conductor. The electric current flows mainly at the "skin" of the conductor, between the outer surface and a level called the skin depth. The skin effect causes the effective resistance of the conductor to increase at higher frequencies where the skin depth is smaller, thus reducing the effective cross-section of the conductor. The skin effect is due to opposing eddy currents induced by the changing magnetic field resulting from the alternating current.

Eddy Currents and a Slit in a Metal Layer or Metal Card Body

A discontinuity interrupts or alters the amplitude and pattern of the eddy currents which result from the induced electromagnetic field generated by a contactless point of sale terminal. The eddy current density is highest near the surface of the metal layer (ML) and decreases exponentially with depth.

RFID Slit Technology

Providing a metal layer in a stackup of a card body, or an entire metal card body, to have a module opening for receiving a transponder chip module (TCM) and a slit (S) to improve contactless (RF) interface with the card—in other words, a "coupling frame"—may be described in greater detail in U.S. Pat. Nos. 9,475,086, 9,798,968, and in some other patents that may be mentioned herein. In some cases, a coupling frame may be formed from a metal layer or metal card body having a slit, without having a module opening. A typical slit may have a width of approximately 100 µm. As may be used herein, a "micro-slit" refers to a slit having a smaller width, such as approximately 50 µm, or less.

"RFID Slit Technology" refers to modifying a metal layer (ML) or a metal card body (MCB) into a so-called "antenna circuit" by providing a discontinuity in the form of a slit, slot or gap in the metal layer (ML) or metal card body (MCB) which extends from a peripheral edge to an inner area or opening of the layer or card body. The concentration of surface current at the inner area or opening can be picked up by another antenna (such as a module antenna) or antenna circuit by means of inductive coupling which can drive an electronic circuit such as an RFID chip attached directly or indirectly thereto. The slit may be ultra-fine (typically less than 50 µm or less than 100 µm), cut entirely through the metal with a UV laser, with the debris from the plume removed by ultrasonic or plasma cleaning. Without a cleaning step after lasing, the contamination may lead to shorting across the slit. In addition, the slit may be filled with a dielectric to avoid such shorting during flexing of the metal forming the transaction card. The laser-cut slit may be further reinforced with the same filler such as a resin, epoxy, mold material, repair liquid or sealant applied and allowed to cure to a hardened state or flexible state. The filler may be dispensed or injection molded. The term "slit technology" may also refer to a "coupling frame" with the aforementioned slit, or to a smartcard embodying the slit technology or having a coupling frame incorporated therein.

Module Antenna (MA)

The term "module antenna" (MA) may refer to an antenna structure (AS) located on the face-down-side of a transponder chip module (TCM) or dual interface chip module (DI chip module) for inductive coupling with an in-card booster antenna (BA) or coupling frame (CF). The antenna structure (AS) is usually rectangular in shape with dimensions confined to the size of the module package having 6 or 8 contact pads on the face-up-side. The termination ends of the antenna structure (AS) with multiple windings (13 to 15 turns) based on a frequency of interest (e.g. 13.56 MHz) are bonded to the connection pads ($L_A$ and $L_B$) on the RFID chip. In the case of a coupling frame (CF) smartcard such as a dual interface metal core transaction card, the module antenna (MA) overlaps the coupling frame or metal layer(s) within the card body at the area of the module opening to accept the transponder chip module (TCM).

Coupling Loop Antenna (CLA)

The term "coupling loop antenna" (CLA) may refer to an antenna structure (AS) which couples to a module antenna (MA) in a transponder chip module (TCM). The windings or traces of the coupling loop antenna (CLA) may intertwine those windings of the module antenna (MA), or the windings or traces of the coupling loop antenna (CLA) may couple closely with the windings of the module antenna (MA) similar in function to a primary and secondary coil of a transformer. The termination ends of a coupling loop antenna (CLA) may be connected to termination points (TPs) across a discontinuity in a metal layer (ML) or metal card body (MCB) acting as a coupling frame (CF).

Coupling Frame Antenna (CFA)

The term "coupling frame antenna" (CFA) may refer to a metal layer or metal card body with a discontinuity may be represented by card size planar antenna having a single turn, with the width of the antenna track significantly greater than the skin depth at the frequency of interest.

Sense Coil (SeC), Patch Antenna (PA) and Pick-Up Coil (PuC)

The terms "Sense Coil" (SeC), "Patch Antenna" (PA) and "Pick-up Coil" (PuC) may refer to various types of coils or antennas used to capture surface current by means of inductive coupling at the edge of a metal layer (ML) or metal card body (MCB) or around a discontinuity in a metal layer (ML) or metal card body (MCB) when such conductive surfaces are exposed to an electromagnetic field. The coils or antennas may be wire wound, chemically etched or laser etched, and positioned at very close proximity to a discontinuity in a metal layer, at the interface between a conductive and non-conductive surface, or at the edge of a metal layer.

Antenna Cell (AC)

The term "antenna cell" (AC) may refer to an antenna structure (AS) such as sense coil (SeC), patch antenna (PA) or pick-up coil (PuC) on a flexible circuit (FC) driving an electronic component such as a fingerprint sensor or a dynamic display. A plurality of antenna cells (ACs) at different locations in a metal transaction card may be used to power several electronic components.

Antenna Probe (AP)

A pick-up antenna in the form of a micro-metal strip (first electrode) may be placed in the middle of a discontinuity to probe eddy current signals from the magnetic flux interaction with the metal layer acting as the coupling frame. The metal layer also acts as the second electrode in the circuit. The metal strip may be replaced by a sense coil with a very fine antenna structure to pick-up the surface currents from within the discontinuity.

Coupling Loop Structure (CLS)

The term "coupling loop structure" (CLS), or simply coupling structure (CS), may refer to a flexible circuit (FC) with a sense Coil (SeC), patch antenna (PA) or pick-up coil (PuC) for inductive coupling with a discontinuity in a metal layer (coupling frame) to pick-up surface currents and to direct such currents via traces or tracks to an antenna having a frame or spiral shape on the flexible circuit (FC) which further inductively couples in close proximity with the module antenna (MA) of a transponder chip module (TCM).

Metal Edge & Metal Ledge

For optimum RF performance, the dimensional width of the windings (or width across multiple windings) of a sense coil (SeC), patch antenna (PA) or a pick-up coil (PuC) ought to overlap a metal edge (ME) of a slit, gap or notch in the card body by 50% of the distance across the windings to capture the surface currents at the metal edge (or ledge).

A sense coil (SeC), patch antenna (PA) or a pick-up coil (PuC) (all or which may be referred to as "antennas", or antenna structures AS) may comprise multiple windings (or tracks), and may have a width. For optimum performance, the antenna should overlap a metal edge (ME).

The same principle of overlap may apply to the module antenna (MA) of a transponder chip module (TCM) implanted in a metal containing transaction card. The dimensional width of the windings of the module antenna (MA) ought to overlap a metal ledge (P1) of a stepped cavity forming the module pocket in a card body by 50% of the distance across the windings of the module antenna.

In the case of an antenna structure (AS) which is an antenna probe (AP), which does not overlap a slit or gap, but rather is disposed within the slit or gap, surface currents may be collected when the antenna probe (AP) is between and very close to the metal edges forming the slit or gap. The probe is disposed within the slit, and may be sized to fit into the slit at close proximity to the walls of the slit. As the shape and form of the antennas may change, the dimensional width of the windings may be replaced by the surface area or volume.

CVV

The term "CVV" is an acronym for the credit card security code that helps verify the legitimacy of a credit card. Depending on the card, the security code can be a three-digit or four-digit number, printed on either on the back of the card or the front. CVV stands for "card verification value" code. Other card issuers call their security codes CVV2 (Visa), CVC2 (MasterCard) or CID (American Express).

Smartcards with Display Capability

Some smartcards have a battery, and include a display for presenting information (such as a security code, or one-time passwords) to the user. Cards having their own, internal power source may be referred to as "active" cards.

Some smartcards have a display, but use energy harvesting, rather than a battery, to power the display. See, for example, WO 2017198842 (2017 Nov. 23; ASK). The display may be e-paper, which requires power only for changing the information on the display.

WO 2017198842 describes an interaction between a smartcard and a smartphone wherein, when the smartcard is brought into proximity with the smartphone, (i) the smartcard is powered "wirelessly" by the smartphone, and (ii) a code generated by the smartcard is displayed on a display of the smartcard. As described therein, there is a physical "wired" (or "hardwired") connection between a first circuit such as a chip (120) or a conversion module (130), and a second circuit including a display module (140). FIG. 6 therein shows an electrical connecting line (3) and a ground line (4) extending between the first circuit (120/130) and the second circuit (140).

US 2020/0034578 (2020 Jan. 30; Finn et al.) discloses SMARTCARD WITH DISPLAY AND ENERGY HARVESTING. A wireless connection may be established between two electronic modules (M1, M2) disposed in module openings (MO-1, MO-2) of a smartcard so that the two modules may communicate (signals, data) with each other. The connection may be implemented by a booster antenna (BA) having two coupler coils (CC-1, CC-2) disposed close to the two modules, and connected with one another. The booster antenna may also harvest energy from an external device such as a card reader, POS terminal, or a smartphone. A coupling antenna (CPA) may have only the two coupler coils connected with one another, without the peripheral card antenna (CA) component of a conventional booster antenna. A module may be disposed in only one of the two module openings. As disclosed therein:

FIG. 2 is a block diagram of a smartcard having a display, according to an embodiment of the invention. [0093]

FIG. 3 is a diagram of a booster antenna having two coupler coils, according to an embodiment of the invention.

FIG. 4A is a diagram of a smartcard having a coupling frame with two openings, for respective two modules.

FIG. 4B is a diagram of a smartcard having two coupling frames, each with an opening for a module.

FIG. 4C is a diagram of a smartcard having a coupling frame with two openings, one (or both) of which may be populated with a module. [0097]

FIG. 2 shows a smartcard (SC) comprising a chip module (CM, or M1) and booster antenna (BA), comparable to those shown in FIG. 1.

The smartcard (SC) further comprises a display module (DM, or M2) disposed in the card body (CB), and having a surface which may be substantially coincident with the front or rear surface of the card body (CB), for displaying information, such as a card verification value (CVV), to the card-holder (user). [0113]

The display module (DM, M2) is physically separate (spaced-apart) and distinct from the chip module (CM, M1) and is not connected by wires to the chip module (CM). The display module (DM, M2) is disposed in a different area of the card body than the chip module (CM, or M1). [0114]

FIG. 4C shows a metal layer (ML) with two module openings (MO-1, MO-2) and respective two slits (S1, S2). Compare FIG. 4A. [0159]

FIG. 4C additionally shows a coupling antenna (CPA) which may similar to the booster antenna (BA) shown in FIG. 3, but without the peripheral card antenna (CA) component. In other words, the coupling antenna (CPA) is shown having two coupler coils (CC-1) and (CC-2) overlapping, within or in close proximity to respective two module openings (MO-1, MO-2) of the card body (CB) and coupling frame (CF). The two coupler coils (CC-1, CC-2) may both have free ends (●). Alternatively, the ends of the two coupler coils could be connected with one another, as illustrated by the dashed line. [0160]

It is a general object of the invention to eliminate the hardwired connection between distinct electronic circuits (or modules) within the smartcard, and effect the connection with a wireless connection between the modules. The wireless connection may convey power and/or data between the modules. The wireless connection may be applicable to two or more modules.

When there are two distinct circuits (or separate modules) that need to communicate with one another, this may involve, at a minimum, passing signals (including data) between the two modules, both of which need to be powered.

The second module opening (MO-2) and its slit (S2) may be located at a different position on the card, such as along a top or bottom edge thereof. The module opening (MO-2) may be omitted, leaving just the slit (S2). The coupling antenna (CPA) may traverse the slits (S1, S2). A portion of the coupling antenna (CPA), more particularly of the coupling coils (CC-1, CC-2) may be disposed adjacent (such as parallel) to the slits (S1, S2).

Some US Patents and Publications

The following US patents and patent application publications are referenced, some of which relate to "RFID Slit Technology":

U.S. Pat. No. 10,599,972 Smartcard constructions and methods
U.S. Pat. No. 10,552,722 Smartcard with coupling frame antenna
U.S. Pat. No. 10,518,518 Smartcards with metal layers and methods of manufacture
U.S. Pat. No. 10,248,902 Coupling frames for RFID devices
U.S. Pat. No. 10,193,211 Smartcards, RFID devices, wearables and methods
U.S. Pat. No. 9,960,476 Smartcard constructions
U.S. Pat. No. 9,836,684 Smartcards, payment objects and methods
U.S. Pat. No. 9,812,782 Coupling frames for RFID devices
U.S. Pat. No. 9,798,968 Smartcard with coupling frame and method of increasing activation distance
U.S. Pat. No. 9,697,459 Passive smartcards, metal cards, payment objects
U.S. Pat. No. 9,634,391 RFID transponder chip modules
U.S. Pat. No. 9,622,359 RFID transponder chip modules
U.S. Pat. No. 9,489,613 RFID transponder chip modules with a band of the antenna extending inward
U.S. Pat. No. 9,475,086 Smartcard with coupling frame and method of increasing activation distance
U.S. Pat. No. 9,390,364 Transponder chip module with coupling frame on a common substrate
2020/0151534 Smartcards with metal layers and methods of manufacture
2020/0050914 Connection bridges for dual interface transponder chip modules
2020/0034578 Smartcard with display and energy harvesting
2020/0005114 Dual interface metal hybrid smartcard
2019/0392283 RFID transponder chip modules, elements thereof, and methods
2019/0197386 Contactless smartcards with multiple coupling frames
2019/0171923 Metallized smartcard constructions and methods
2019/0114526 Smartcard constructions and methods
2018/0341847 Smartcard with coupling frame antenna
2018/0341846 Contactless metal card construction
2018/0339503 Smartcards with metal layers and methods of manufacture Some Additional US Patents and Publications of Interest
U.S. Pat. No. 10,583,683 (10 Mar. 2020; Ridenour et al.). See also 2020/0164675.
U.S. Pat. No. 10,534,990 (14 Jan. 2020; CompoSecure; Herslow et al.)
U.S. Pat. No. 10,445,636 (15 Oct. 2019; Giesecke & Devrient; Virostek et al.)
U.S. Pat. No. 10,395,164 (27 Aug. 2019; Fingerprint Cards; Lundberg et al.)
U.S. Pat. No. 10,325,135 (18 Jun. 2019; Fingerprint Cards; Andersen et al.)
U.S. Pat. No. 10,318,859 (11 Jun. 2019; CompoSecure; Lowe, et al.)
U.S. Pat. No. 10,289,944 (14 May 2019; CompoSecure; Herslow et al.)
U.S. Pat. No. 10,275,703 (30 Apr. 2019; CompoSecure; Herslow et al.)
U.S. Pat. No. 10,140,569 (27 Nov. 2018; Kim et al.)
U.S. Pat. No. 10,089,570 (2 Oct. 2018; CompoSecure; Herslow et al.)
U.S. Pat. No. 10,032,169 (2018 Jul. 24; Essebag et al.; Ellipse World)
U.S. Pat. No. 9,898,699 (20 Feb. 2018; CompoSecure; Herslow et al.)
U.S. Pat. No. 9,892,405 (13 Feb. 2018; Cardlab; Olson et al.)
U.S. Pat. No. 9,760,816 (12 Sep. 2017; Williams et al.). See also U.S. Pat. No. 9,836,687.
U.S. Pat. No. 9,727,759 (2017 Aug. 8; Essebag et al.; Ellipse World)
U.S. Pat. No. 9,721,200 (1 Aug. 2017; Herslow et al.)
U.S. Pat. No. 9,564,678 (7 Feb. 2017; Kato et al.). See also U.S. Pat. Nos. 8,976,075 and 9,203,157.
U.S. Pat. No. 9,390,366 (12 Jul. 2016; Herslow et al.)
U.S. Pat. No. 9,299,020 (29 Mar. 2016; Zimmerman et al.; TheCard)
U.S. Pat. No. 9,024,763 (5 May 2015; Hamedani Soheil)
U.S. Pat. No. 8,931,691 (2015 Jan. 13; Manessis et al.; VISA)
U.S. Pat. No. 8,777,116 (2014 Jun. 15; Lin; Smartdisplayer)
U.S. Pat. No. 8,737,915 (27 May 2014; J. H. Tonnjes E. A. S. T.; Beenken)
U.S. Pat. No. 8,608,082 (17 Dec. 2013; La Garrec et al.; Oberthur Technologies, aka IDEMIA)
U.S. Pat. No. 8,490,872 (2013 Jul. 23 Kim)
U.S. Pat. No. 8,448,872 (2013 May 28; Droz; Nagra ID)
U.S. Pat. No. 8,393,547 (12 Mar. 2013; Perfect Plastic Printing; Kiekhaefer et al.)
U.S. Pat. No. 8,186,582 (29 May 2012; American Express; Varga et al.). See also U.S. Pat. No. 8,523,062
U.S. Pat. No. 7,306,163 (11 Dec. 2007; IBM; Scholz et al.)

U.S. Pat. No. 6,491,229 (10 Dec. 2002; NJC Innovations; Berney)
U.S. Pat. No. 6,452,563 (17 Sep. 2002; Gemplus aka Gemalto; Porte)
2019/0384261 (19 Dec. 2019; Kona I; Nam et al.)
2019/0311235 (2019 Oct. 10; Sexl et al.; (Giesecke & Devrient)
2019/0311236 (2019 Oct. 10; Sexl et al.; (Giesecke & Devrient)
2019/0291316 (2019 Sep. 26; Lowe; now U.S. Pat. No. 10,583,594).
2019/0286961 (2019 Sep. 19; Lowe)
2019/0251322 (15 Aug. 2019; IDEX ASA; Slogedal et al.)
2019/0251411 (2019 Aug. 15; Gire et al.; Paragon ID)
2019/0236434 (1 Aug. 2019; CompoSecure; Lowe)
2019/0160717 (2019 May 30; Lowe)
2019/0156994 (23 May 2019; X-Card Holdings; Cox)
2019/0102662 (4 Apr. 2019; Zwipe; Snell et al.)
2019/0073578 (7 Mar. 2019; Lowe et al.)
2019/0050706 (14 Feb. 2019; Lowe) now U.S. Pat. No. 10,406,734
2018/0005064 (4 Jan. 2018; Next Biometrics; Vogel et al.)
2016/0148194 (2016 May 26; Guillad et al.; Nagraid)
2015/0206047 (23 Jul. 2015; Herslow)
2014/0279555 (2014 Sep. 18; Guillaud; Nagraid)
2014/0231503 (21 Aug. 2014; Smart Co.; Kunitaka)
2013/0126622 (23 May 2013; Finn)
2012/0112971 (10 May 2012; Takeyama et al.;)
2011/0181486 (28 Jul. 2011; Kato;)

Some non-patent literature and non-US patents and publications:

Chen, S. L., Kuo, S. K. and Lin C. T. (2009), "A metallic RFID tag design for steel-bar and wire-rod management application in the steel industry" (Progress in Electromagnetics Research, PIER Vol. 91: pp. 195-212.)
EP 2372840 (25 Sep. 2013; Hashimoto; Panasonic)
CN 205158409U (13 Apr. 2016)
KR 10-1754985 (30 Jun. 2017; Kim et al.; Aichi CK Corporation aka ICK)
PCT/US2019/020919 (12 Sep. 2019; Cox; X-Card Holding)
WO 2017/090891 (1 Jun. 2017; Yoon et al.; Biosmart)
WO 2017/198842 (2017 Nov. 23; Gire et al.; ASK)

SUMMARY

The invention may relate to innovations in or improvements to RFID-enabled ("contactless capable) metal smartcards or metal transaction cards with/having an electronic device such as a biometric (fingerprint) sensor and/or a display. Also relates to incorporating an electronic system capable of performing security authentication into the card.

It is an object of the invention(s), as may be disclosed in various embodiments presented herein, to provide improvements in the manufacturing, performance and/or appearance of smartcards (also known as transaction cards), such as metal transaction cards and, more particularly, to RFID-enabled smartcards (which may be referred to herein simply as "cards") having at least contactless capability, including dual interface (contactless and contact) smartcards, including cards having a metal layer in the stackup of their card body, and including cards having a card body which is substantially entirely formed of metal (i.e., a metal card body).

It is an object of the invention to produce solid metal transaction cards without synthetic material sandwiching the metal or laminated to the metal, and that the metal transaction cards can operate in contact and contactless mode, with the capability to harvest and store energy from an electromagnetic field.

It is an object of the invention to integrate electronic components into the card body, such as a fingerprint sensor, dynamic display, measurement sensor, switching element and camera.

According to the invention, generally, smartcards (SC) having a metal layer (ML) or metal card body (MCB) and a module opening (MO) for a transponder chip module (TCM). One or more slits (S) or notches (N) may extend from a peripheral edge of the metal layer or card body, into an interior area of the metal layer of card body, without extending to the module opening. A flexible circuit (FC) with patch antennae (PA) or sense coils (SeC) connected to a coupling loop structure (CLS) with an antenna structure (AS) on the same substrate may be incorporated into the card body (CB). A fingerprint sensing module comprising an electrically-conductive metal bezel housed in the card may be electrically isolated from the metal layer or metal card body by the application of coatings (DLC) or anodizing (oxidizing) the respective metal surfaces. The cards may be contactless only, contact only, or dual-interface (contact and contactless).

According to some embodiments (examples) of the invention, a smartcard may comprise: one or more modules (TCM, DM, FS), each having a module antenna (MA); and a metal layer (ML) or metal card body (MCB) having one or more module openings (MO) for accepting the one or more modules, and further having one or more slits (S) or notches (N) extending from a periphery of the layer towards an interior position of the metal layer; wherein: at least one of the slits or notches do not extend to the one or more module openings (MO); and further comprising: a coupling structure (CS) comprising (i) one or more antenna structures (AS, PA, SeC, AP, PA) overlying or fitting into at least one of the slits or notches, and (ii) a coupling loop structure (CLS) overlying the module antenna (MA) of at least one of the modules. The coupling structure (CS) may reside on a flexible circuit (FC), such as of PCB material (e.g., FR4). A recess (R) may be formed in the metal layer (ML) around an area of the slit, and the module opening (MO), although the module opening is not present in some embodiments. The flexible circuit may fit into the recess in the card body. The smartcard may further comprise a ferrite layer disposed between the flexible circuit (FC) and the metal layer (ML) to offset the effects of electromagnetic attenuation caused by the metal layer (ML). The ferrite layer may be disposed on either the flexible circuit or on the metal layer. The card may further comprise a Secure Processing Module capable of functioning as an energy harvesting module; and the antenna structures may be connected with the secure processing module via the flexible circuit (FC). The coupling structure (CS) may be referred to as a coupling loop structure (CLS), and vice-versa.

In a conventional, well known, prior art manner, a rear plastic subassembly may be joined with an adhesive layer, to a rear side of the metal layer or metal card body. The rear plastic subassembly may comprises a rear printed layer and a rear overlay layer.

According to some embodiments (examples) of the invention, a metal smartcard may comprise: a metal layer (ML) or metal card body (MCB) having (i) a discontinuity in the form of a slit (S) or gap (G); and (ii) a sense coil (SeC) disposed at a location of the discontinuity; wherein the sense coil captures surface currents at the edge or within the discontinuity to power at least one electronic component (or module) comprising at least one of a fingerprint sensor (FS) module and a transponder chip module (TCM). A fingerprint sensor (FS) module may comprise a metal bezel having a slit to enable it to function as a coupling frame to drive the fingerprint sensor module. There may be a plurality of discontinuities disposed around the periphery of the metal layer (ML) or metal card body (MCB); and a corresponding plurality of sense coils located at each of the discontinuities to maximize the delivery of power to the electronic components by using a sense coil (SeC) at each discontinuity to capture current flows.

According to some embodiments (examples) of the invention, a smartcard may comprise: a metal card body (MCB) comprising one or more metal layers (ML); and an electronic system capable of performing security authentication; wherein the electronic system comprises: a display screen; a display driver control module for driving the display screen; a microprocessor controller connected to the display driver control module; and a communication module connected to and working with a dual interface chip module to perform the security authentication. The smartcard may further comprise at least one antenna circuit for inductive coupling to power the electronic system; wherein the least one flexible antenna circuit is coupled to at least one discontinuity in the metal card body. The metal card body may function as a ground plane (such as to facilitate operation of the fingerprint sensor).

In a manner known in the prior art, the metal card body may comprise (i) a front metal face (metal layer) and (ii) a rear metal face (metal layer) separated from the front metal face by a dielectric layer of material. However, the prior art does not teach that the front and rear metal faces may each act as an electrode, or that the front and rear metal faces may each act as a conductive chassis for power and data communication (such as between physically-separated modules in the card).

According to an embodiment of the invention, metal hybrid smartcards (SC) may comprise:
  (i) a front face metal card body (MCB) with a short slit (S) or notch (N) extending into the metal card body (MCB) acting as a coupling frame (CF);
  (ii) a rear plastic backing (PB) layer with printed graphics and a protective overlay layer capturing the magnetic stripe and signature panel;
  (iii) a flexible circuit (FC), disposed with one or two patch antennae (PA) or sense coils (SeC) connected to a coupling loop structure (CLS) with an antenna structure (AS) on the same substrate, mounted to a recess (R) in the metal card body (MCB) or assembled to the rear plastic backing (PB);
  (iv) a module opening (MO) in the metal card body (MCB) to accept a transponder chip module (TCM) having a module antenna (MA) connected to an RFID chip;
  (v) the coupling loop structure (CLS) having a frame or spiral shape antenna structure on the flexible circuit (FC), assembled in the stack-up construction to overlap the module antenna (MA) of the transponder chip module (TCM) to allow for inductive coupling;
  (vi) the recess (R) may be formed in the metal card body (MCB) to house the flexible circuit (FC) which extends from the area surrounding the slit (S) or notch (N) to the area of the module opening (MO), and may further comprise an anti-shielding material between the flexible circuit (FC) and the metal card body (MCB); and
  (vii) the slit (S) or notch (N) in the metal card body does not extend to the module opening (MO), thus maintaining (reducing compromising) the mechanical integrity of the smartcard (SC).

A coupling loop structure (CLS) with two patch antennae (PA) for collection of surface current flows may also apply to coupling frames with slits extending from a periphery edge to a module opening in order to improve the RF performance of a dual interface metal transaction card.

Such cards may be contactless only, contact only, or may be dual-interface (contact and contactless) cards.

According to the invention, generally, EMV metal cards may comprise a fingerprint sensor passively powered by capturing the surface eddy density in a discontinuity or discontinuities in a metal layer (ML) or metal card body (MCB). The discontinuity in the form of a slit (S), gap (G) or notch (N) allows for the harvesting of energy using a sense coil (SeC) on a flexible circuit (FC) to inductively couple with the inner and surface flowing currents. The sense coil may overlap the discontinuity or pass through the interior of the discontinuity to maximize the delivery of power. A metal bezel of the fingerprint sensor may have a slit and be used as a coupling frame to drive the fingerprint sensor.

A fingerprint sensing module (FS, FSM) comprising an electrically conductive bezel may be housed in a metal transaction card without over grounding the swing voltage driving the pixels of the fingerprint sensor. The metal card body may be electrically isolated from the metal bezel by the application of coatings (DLC) or anodizing (oxidizing) the metal surface to prevent electrical contact between the active bezel drive and the metal card body.

According to the invention, generally, a passive contactless or dual interface metal smartcard to conduct transactions with an on-board screen displaying dynamic security codes (such as numerical, alphanumerical or symbols), with said metal smartcard receiving energy through its contact interface or harvesting energy through its contactless interface which couples to the electromagnetic field generated by a point of sale terminal or any NFC/RFID-enabled device such as a cell phone, to power its RFID chip or dual interface microcontroller, electronic ink display and any other electronic component such an OTP (One-Time-Password) generator, memory, voltage regulator, LED, switch, keypad, or any discrete component incorporated therein.

The individual components may be powered through inductive coupling using RFID slit technology. Each component may have a micro-antenna to pick up inductive/reactive power from a discontinuity in a metal layer forming the metal card body. Communication between components may be achieved through a hard wire connection or may result through transmission of data on the carrier frequency, at any harmonic thereof or at any ISM frequency.

In the case of no physical galvanic connection between the components such as the microprocessor and the display, the individual components can be embedded in the metal smartcard body after card stack-up lamination. Alternatively, electrical coupling of the microprocessor and display can be reduced to one or two connections (I/O, GND), using the electrical conduction of the metal card body chassis.

The invention makes use of the surface eddy currents which flow along the outer perimeter (or an inner) edge of a conductive surface such as a metal card body (MCB) which has been exposed to electromagnetic waves generated by a contactless reader or terminal. The intensity of such eddy currents at the frequency of interest is a maximum along the skin depth of the metal at its perimeter edge. The skin depth of copper, for example, at 13.56 MHz is approximately 18 μm.

Generally, in the prior art, a coupling frame (CF) comprises a metal layer (ML) or metal card body (MCB) having a slit (S) extending from a peripheral edge of the metal layer or metal card body to an opening (MO) for receiving a transponder chip module (TCM) comprising an RFID chip (IC) and a module antenna (MA), for enabling a contactless interface. A dual-interface module may also have contact pads (CP) for enabling a contact interface.

According to the invention, a coupling frame may comprise a metal layer (typically the size of the ID-1 card) or a metal card body and a slit (S) or notch (N) extending in from a perimeter edge thereof, without requiring a module opening. The distance which the slit (S) or notch (N) needs to extend from the perimeter edge across the metal layer (ML) or metal card body (MCB), concentrating the surface current density needs to be a substantial multiple of the skin depth distance to facilitate the diversion of current. Notably, the slit (S) or notch (N) passes entirely through the metal layer (ML, MCB).

In order to divert the surface currents from the surrounding area of the slit (S) or notch (N) to the area of the module antenna (MA) on the bond side of the transponder chip module (TCM) with its track ends connected to an RFID chip, it is proposed to use a flexible circuit (FC) with a patch antenna (PA) (sense coil) to pick-up the surface eddy currents around the area of the slit (S) or notch (N) and conduct such current flows to a coupling loop structure (CLS) having a frame or spiral shape on the flexible circuit (FC) which inductively couples with the module antenna (MA) of the transponder chip module (TCM). As the slit (S) or notch (N) extends only a short distance into the metal card body (MCB), the mechanical stability of the metal smartcard (SC) is retained.

In a further variation of the above, an additional slit (S) or notch (N) is created on the opposite side of the metal card body (MCB). In this configuration, the flexible circuit (FC) has two patch antennae (PA) (or sense coils (SeC)), each overlapping a slit(s) or notch(s) in the metal card body (MCB), and the surface currents from both sides of the metal card body (MCB) are directed to the coupling loop structure (CLS) with an antenna structure (AS) which further overlaps the module antenna (MA) of the transponder chip module (TCM). The surface current directional flow at the edge of the metal card body for the opposing slits is observed by the polarity connection to the patch antenna (PA).

The flexible circuit (FC) disposed with one or two patch antennae (PA) or sense coils (SeC) and a coupling loop structure (CLS) with an antenna structure (AS) to overlap the module antenna (MA) of a transponder chip module (TCM) may be regarded as a booster circuit (BC) picking up surface eddy currents and concentrating the current density around the coupling loop structure (CLS) with an antenna structure (AS) which inductively couples with the module antenna (MA) connected to an RFID chip module (CM).

In an embodiment of the invention, the flexible circuit (FC) may be an integral part of the transponder chip module (TCM) comprising of a patch antenna (or sense coil (SeC)) or a coupling loop structure (CLS) connected directly to the RFID chip assembled or mounted thereto, without the need to inductively couple via a module antenna (MA). Therefore, the patch antenna or sense coil to pick-up currents around a slit may be connected directly to the pads $L_A$ and $L_B$ of the RFID chip. The flexible circuit may also have contact pads to interface with a contact reader. The flexible circuit may also have a connection to a separate spiral or rectangular antenna to further drive and power the RFID chip.

In an embodiment of the invention, the chip module with a dual interface silicon die assembled thereto may not have a module antenna on the rear side of the chip package, but rather the connection pads $L_a$ and $L_b$ for the antenna are connected to the flexible circuit which inductively couples with the slit or slot in the metal card body. The flexible circuit may be chemically or laser etched.

According to an embodiment of the invention, a flexible circuit (FC) with a sense coil (SeC) or patch antenna (PA) is used to pick-up surface currents around a discontinuity in a metal card body (MCB) to drive an RFID chip or a device hereinafter called a component (C), either directly through a physical interconnection between the component (C) and the flexible circuit (FC) or through inductive coupling between the component having an antenna structure (AS) to interface with an antenna structure (AS) on the flexible circuit (FC) connected to the sense coil (SeC) or patch antenna (PA).

According to an embodiment of the invention, the flexible circuit (FC) with a micro-sense coil (SeC) or micro-patch antenna (PA) may pass over the surface and through the discontinuity in the metal layer (ML) or metal card body (MCB) to pick-up currents flowing around and within the slit (S), gap (G) or notch (N). In other words, the current is being collected from the surface of the metal layer (ML) as well as from the inner area of the discontinuity.

According to an embodiment of the invention, a plurality of discontinuities may be arranged around the perimeter edges of the metal card body (MCB) with a flexible circuit (FC) having antenna structures (AS) or antenna cells (AC) to interface with each discontinuity. The polarity of the current flow in the antenna cells is arranged to maximize the power delivery.

According to an embodiment of the invention, a fingerprint sensing module comprising an electrically conductive bezel may be housed in a metal transaction card without over grounding the swing voltage driving the pixels of the fingerprint sensor.

According to an embodiment of the invention, the metal card body may be electrically isolated from the metal bezel by the application of coatings (DLC) or anodizing the metal surface (oxidation) to prevent contact between the active bezel drive and the metal card body.

It is an object of the invention to create a battery-free dynamic CVV display card using RFID slit technology which can refresh the electronic ink display with a new verification value when the smartcard is inserted into a point of sale (POS) terminal (in contact or contactless mode), when the card is inductively paired to a NFC enabled cell phone and or through clock synchronization with the payment authentication server.

It is an object of the invention to house the electronic components including the display between reinforced metal layers and that the metal transaction card retains its metal sound integrity when tossed on a hard surface.

It is an object of the invention to create a passive contactless or dual interface metal smartcard to conduct transactions with an on-board screen displaying dynamic security codes (such as numerical, alphanumerical or symbols), with said metal smartcard receiving energy through its contact interface or harvesting energy through its contactless interface which couples to the electromagnetic field generated by a point of sale terminal or any NFC/RFID-enabled device such as a cell phone, to power its RFID chip or dual interface microcontroller, electronic ink display and any other electronic component such an OTP (One-Time-Password) generator, memory, voltage regulator, LED, switch, keypad, or any discrete component incorporated therein.

The individual components may be powered through inductive coupling using RFID slit technology. Each component may have its own micro-antenna to pick up inductive/reactive power from a discontinuity in a metal layer forming the metal card body. Communication between components may be achieved through a hard wire connection or may result through transmission of data on the carrier frequency, at any harmonic thereof or at any ISM frequency.

In the case of no physical galvanic connection between the components such as the microprocessor and the display, the individual components can be embedded in the metal smartcard body after card stack-up lamination. Alternatively, electrical coupling of the microprocessor and display can be reduced to one or two connections (I/O, GND), using the electrical conduction of the metal card body chassis.

The dynamic security code values (DSCVs) may be updated or refreshed when in the presence of an electromagnetic field and synchronized with a time stamp from a remote server. The codes or values may be generated by an on-card algorithm or by a remote server. The device may be designed to conduct secure transactions without an internal battery power source.

The invention may further relate to a metal inlay used in the stack-up construction of a passive display card incorporating metal layers with a discontinuity, with said metal layers sandwiching the electronic components integrated therein. Said at least one discontinuity in one of the metal layers may be used to concentrate electromagnetic energy around an RFID chip or a dual interface chip module to power its operation, while at the same time another discontinuity in another metal layer is used to drive a display.

The electronic components may be sandwiched between metal layers wherein a dielectric separates the metal layers as well as reinforces the mechanical stability of the card construction while at the same time retaining the metal sound integrity of the card. The dielectric may be made from a fiber (e.g. glass or carbon) or any suitable composite material.

The metal layers separated by a dielectric may further operate as electrodes, incorporating a supercapacitor or a battery.

The dynamic display may be refreshed with a new verification code after each contactless transaction event or a contact transaction event.

In the main, hereinafter, metal transaction cards with dynamic CVV display and RFID devices such as metal payment cards and objects incorporating a transponder chip module may be passive devices, not having a battery and harvesting power from an external contactless reader (ISO 14443). However, some of the teachings presented herein may find applicability with cards having self-contained power sources, such as small batteries (lithium-ion batteries with high areal capacity electrodes) or supercapacitors. (Supercapacitors may be used to store energy.) Electrode capacities are compared through three different measures: capacity per unit of mass (known as "specific energy" or "gravimetric capacity"), capacity per unit volume ("volumetric capacity"), and area-normalized specific capacity ("areal capacity").

In their various embodiments, the invention(s) described herein may relate to industrial and commercial industries, such RFID applications, payment smartcards (metal, plastic or a combination thereof), electronic credentials, identity cards, loyalty cards, access control cards, and the like.

Other objects, features and advantages of the invention(s) disclosed herein may become apparent in light of the following illustrations and descriptions thereof.

BRIEF DESCRIPTION OF THE DRAWINGS

Reference will be made in detail to embodiments of the disclosure, non-limiting examples of which may be illustrated in the accompanying drawing figures (FIGs). The figures may generally be in the form of diagrams. Some elements in the figures may be stylized, simplified or exaggerated, others may be omitted, for illustrative clarity.

Although the invention is generally described in the context of various exemplary embodiments, it should be understood that it is not intended to limit the invention to these particular embodiments, and individual features of various embodiments may be combined with one another. Any text (legends, notes, reference numerals and the like) appearing on the drawings are incorporated by reference herein.

Some elements may be referred to with letters ("AS", "CBR", "CF", "CLS", "FC", "MA", "MT", "TCM", etc.) rather than or in addition to numerals. Some similar (including substantially identical) elements in various embodiments may be similarly numbered, with a given numeral such as "310", followed by different letters such as "A", "B", "C", etc. (resulting in "310A", "310B", "310C"), and may collectively (all of them at once) referred to simply by the numeral ("310").

Figure 1:
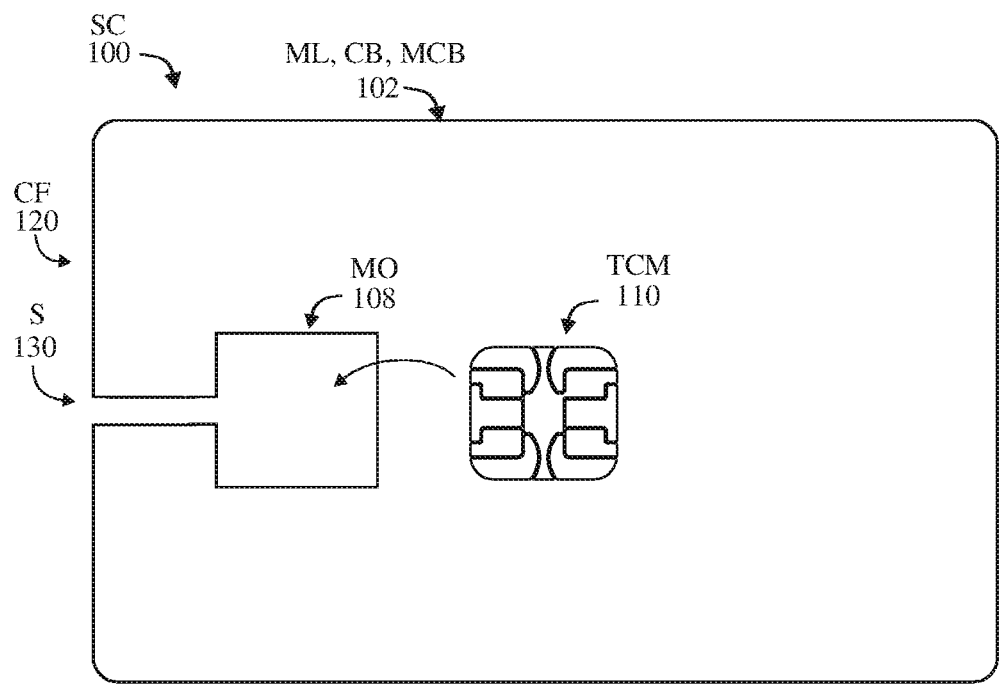
Figure 3:
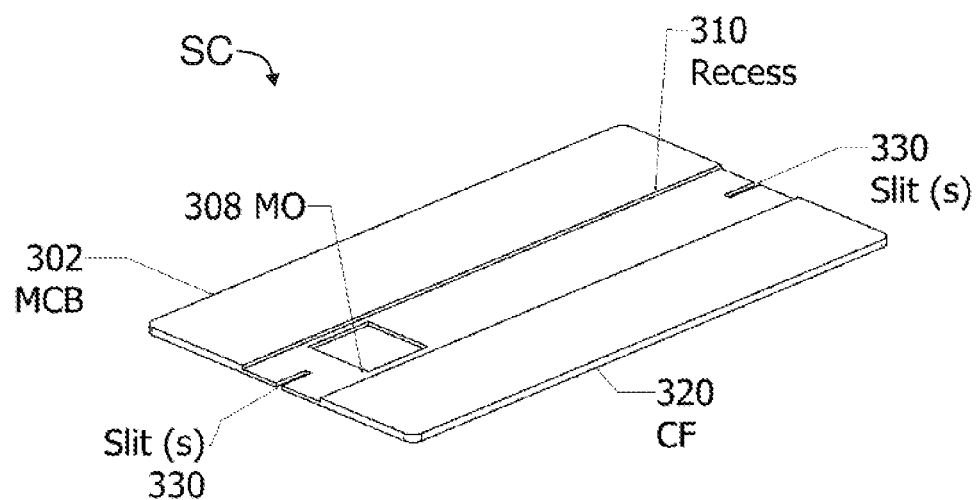

FIG. 1 (compare FIG. 3 of U.S. Pat. No. 9,836,684) is a diagrammatic view of a front surface of a smartcard (SC) which may be a metal card, composite metal card or encapsulated metal card having a slit (S) to function as a coupling frame (CF), according to the prior art.

Figure 2:
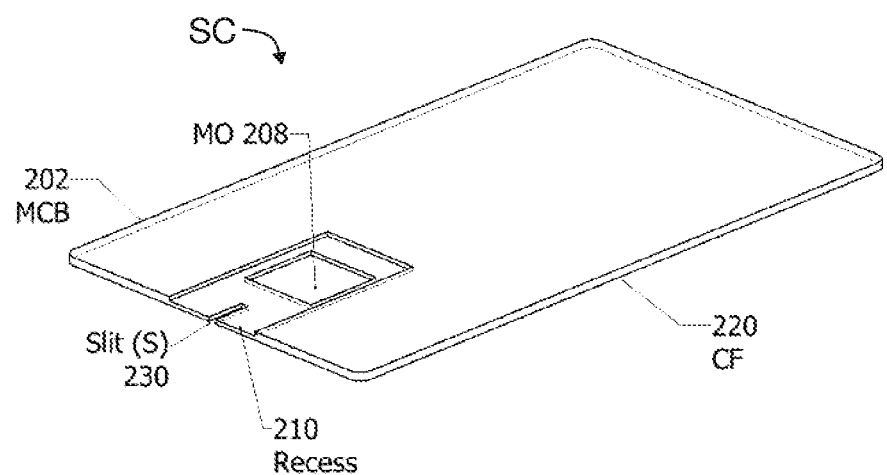

FIG. 2 (compare FIG. 2 of U.S. 62/978,826) is a diagrammatic view of a front surface of a metal hybrid smartcard (SC) which may be a metal card with a rear plastic backing having a slit (S) or notch (N) in the front face metal layer to function as a coupling frame (CF) and a recess (R) in the metal to accept a flexible circuit (FC), according to the invention.

FIG. 3 (compare FIG. 3 of U.S. 62/978,826) is a diagrammatic view of a front surface of a metal hybrid smartcard (SC) which may be a metal card with a rear plastic backing having a slit (S) or notch (N) on both sides of the front face metal layer to function as a coupling frame (CF) and a recess (R) in the metal to accept a flexible circuit (FC), according to the invention.

Figure 4:
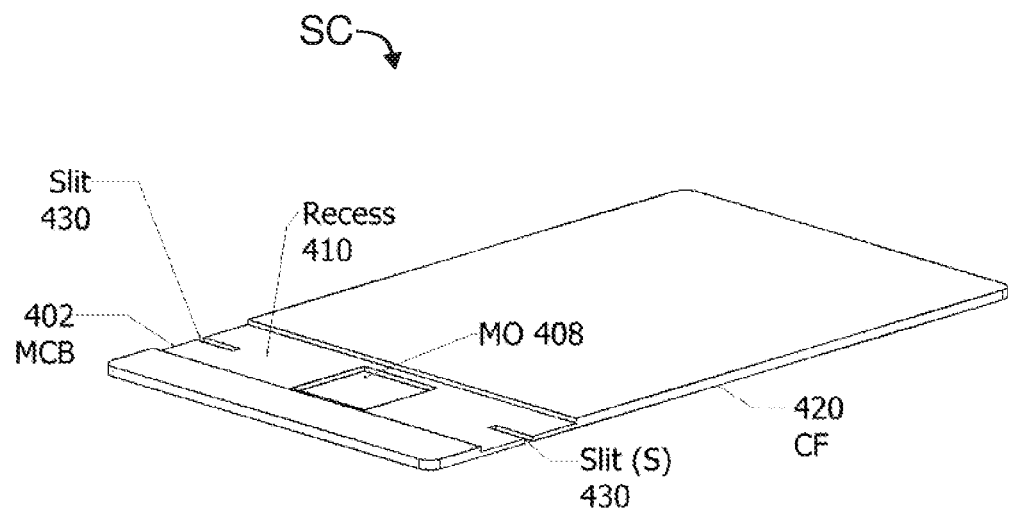

FIG. 4 (compare FIG. 4 of U.S. 62/978,826) is a diagrammatic view of a front surface of a metal hybrid smartcard (SC) which may be a metal card with a rear plastic backing having a slit (S) or notch (N) on both sides of the front face metal layer with a different orientation to FIG. 3 to function as a coupling frame (CF) and a recess (R) in the metal to accept a flexible circuit (FC), according to the invention.

Figure 5A:
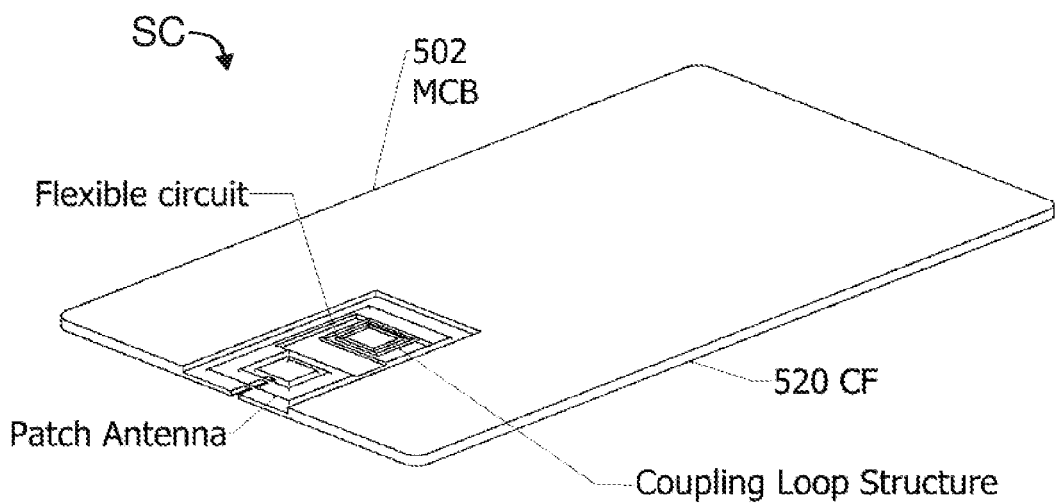
Figure 5B:
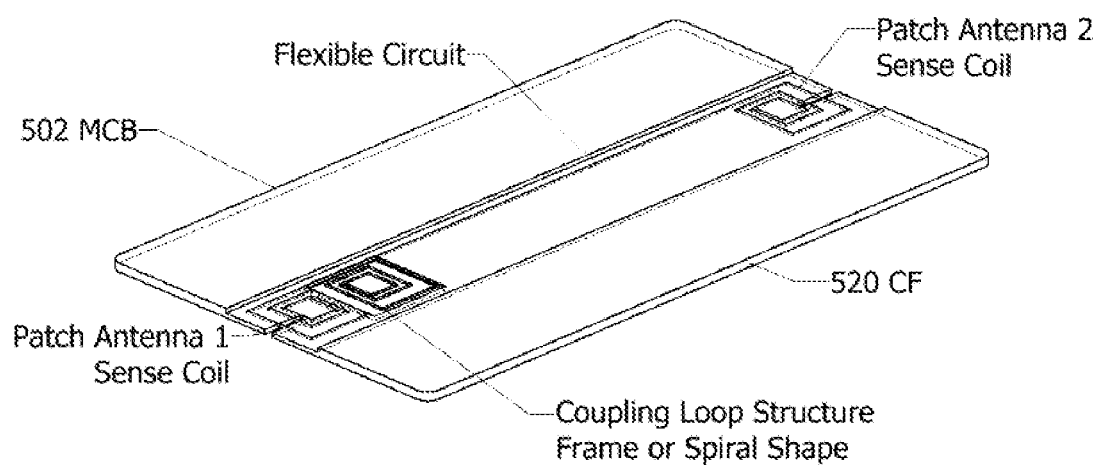

FIGS. 5A and 5B (compare FIGS. 5A and 5B of U.S. 62/978,826) are diagrams of a flexible circuit (FC) with a patch antenna (or sense coil) to overlap a slit (S) or notch (N) in a metal card body (MCB) and a coupling loop structure (CLS) to overlap a module antenna (MA) in a transponder chip module (TCM), mounted into a recess (R) in the metal card body (MCB), according to the invention.

Figure 6A:
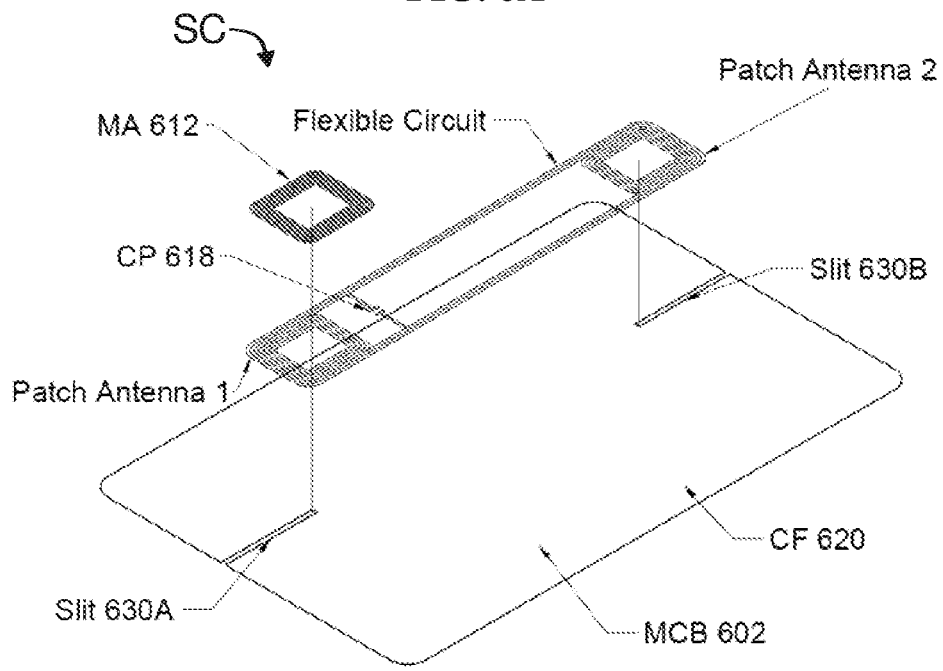

FIG. 6A (compare FIG. 6 of U.S. 62/978,826) is a diagram (perspective view) of a flexible circuit (FC) with two patch antennae (or sense coils) as part of a coupling loop structure (CLS) with the first patch antenna (PA 1) overlapping a slit (S) and a module antenna (MA) of a transponder chip module (TCM) on one side of the metal card body (MCB), and a second patch antenna (PA 2) overlapping a slit on the opposite side of the metal card body (MCB), with the second patch antenna (PA 2) providing additional power to the RFID chip by collecting surface currents from one side of the metal card body (MCB) and feeding the current flows to the first patch antenna (PA 1) which inductively couples with the module antenna (MA) of the transponder chip module (TCM, not shown), according to the invention. A capacitor may be connected in series or parallel with the coupling loop structure (CLS) to regulate the system frequency or improve the RF performance of the dual interface metal transaction card. The slit (S) on each side of the card body (MCB) extends from a periphery edge to an interior area of the card body (MCB) to pick-up surface currents by coupling with a patch antenna (PA), with at least one slit (S) underlying a module antenna (MA) or any electronic device, according to the invention.

Figure 6B:
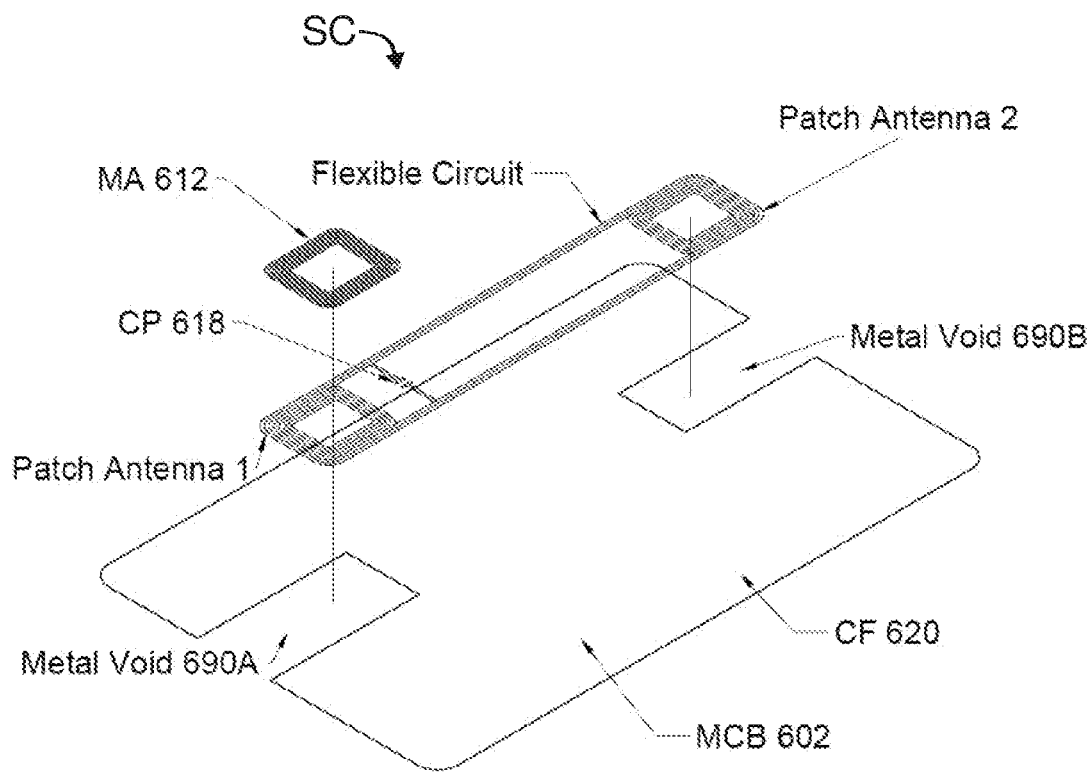

FIG. 6B is a diagram (perspective view), similar to FIG. 6A, showing a flexible circuit (FC) with two patch antennae (or sense coils) as part of a coupling loop structure (CLS) with the first patch antenna (PA 1) fitting within a void (or wide slit) on one side of the metal card body (MCB), and the second patch antenna (PA 2) fitting within a void (or wide slit) on the opposite side of the metal card body (MCB), according to the invention.

Figure 6C:
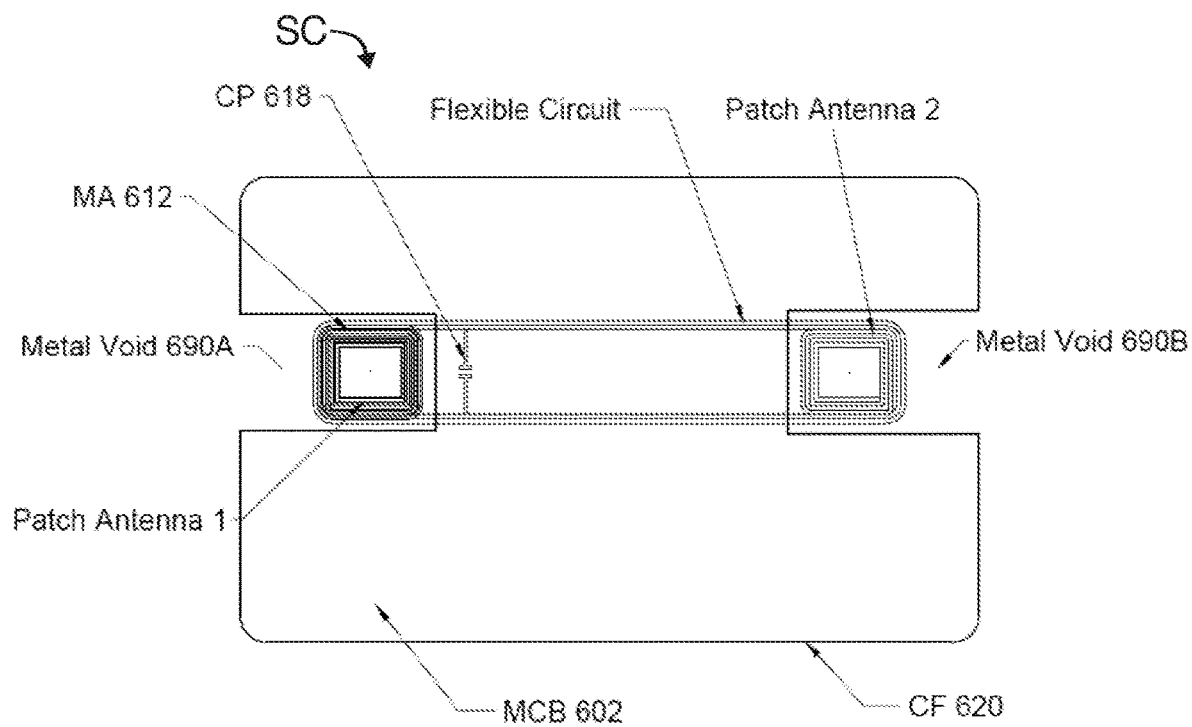

FIG. 6C is a diagram (plan view), similar to FIG. 6B, showing a flexible circuit (FC) with two patch antennae (or sense coils) as part of a coupling loop structure (CLS) with the first patch antenna (PA 1) fitting within a void (or wide slit) on one (left) side of the metal card body (MCB), and the second patch antenna (PA 2) fitting within a void (or wide slit) on the opposite (right) side of the metal card body (MCB), with a capacitor connected in series or parallel with the patch antennae, according to the invention.

Figure 6D:
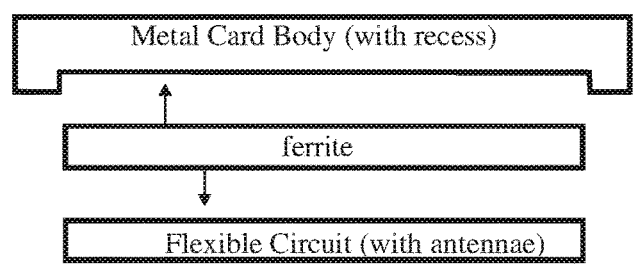

FIG. 6D is a diagram (cross-sectional view) of a flexible circuit (FC) disposed below a metal card body (MCB) having a recess on its rear surface for accepting the flexible circuit, and showing that a layer of ferrite may be disposed on the front of the flexible circuit or the rear of the metal card body, according to the invention. The flexible circuit (FC) may be provided with antenna structures (AS) of various formats (SeC, PA, etc.).

Figure 7:
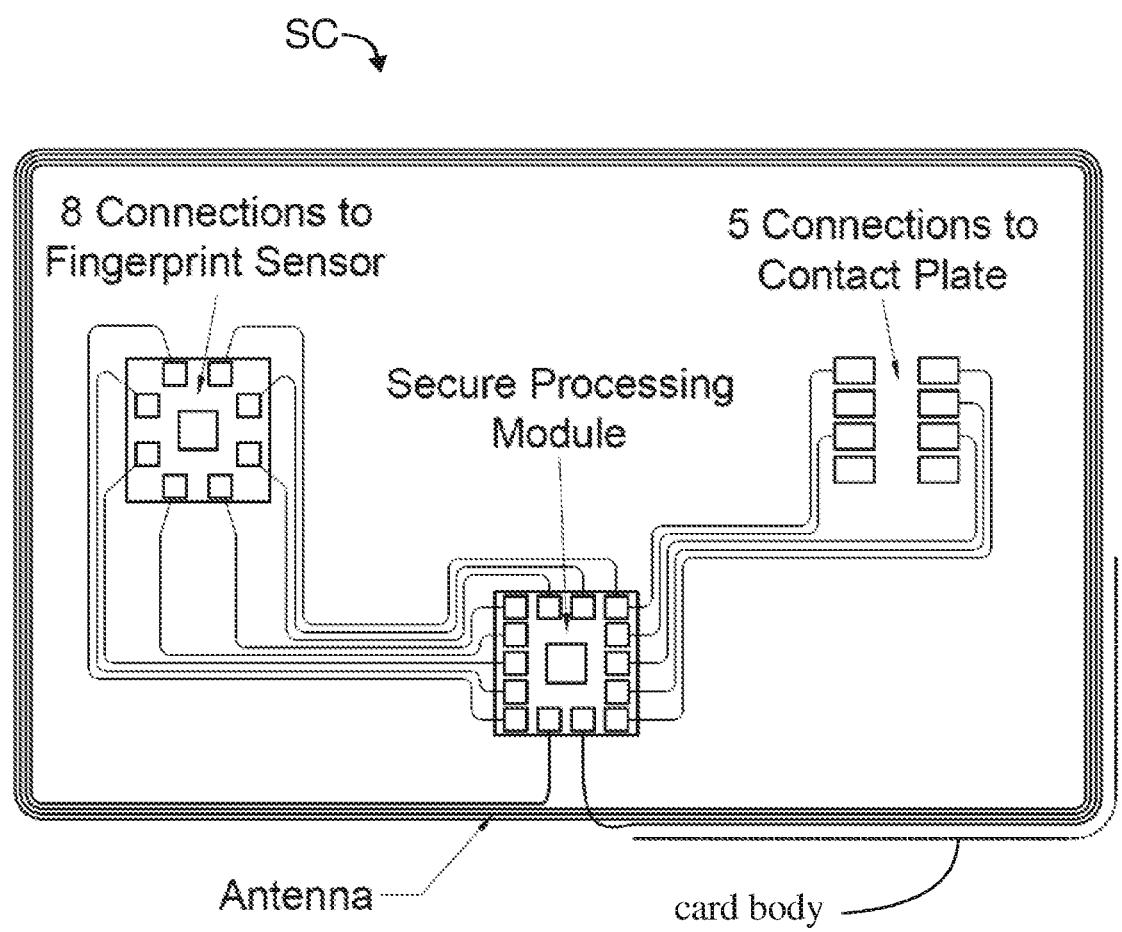

FIG. 7 (compare FIG. 2 of U.S. 62/936,519) is a schematic view of a plastic biometric smartcard (SC) comprising an antenna (wire embedded or chemically etched) with several turns, contact pads on a module tape connected to a secure processing module with further (seven or eight) connections thereof to a fingerprint sensor, according to the prior art.

Figure 8A:
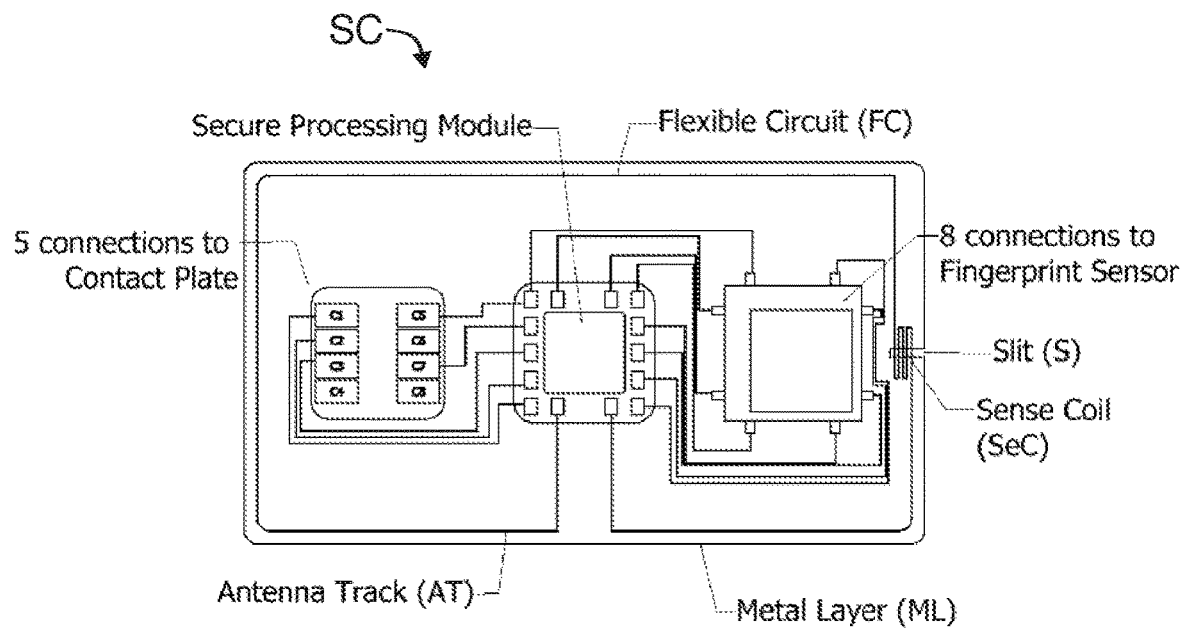

FIG. 8A (compare FIG. 3A of U.S. 62/936,519) is a schematic view of a biometric metal smartcard comprising a metal layer (ML) or metal card body (MCB), interconnected components mounted thereto, a discontinuity in the form of a slit (S) or gap (G) and a flexible circuit (FC) with a sense coil (SeC) overlapping the slit in a perpendicular arrangement, according to the invention.

Figure 8B:
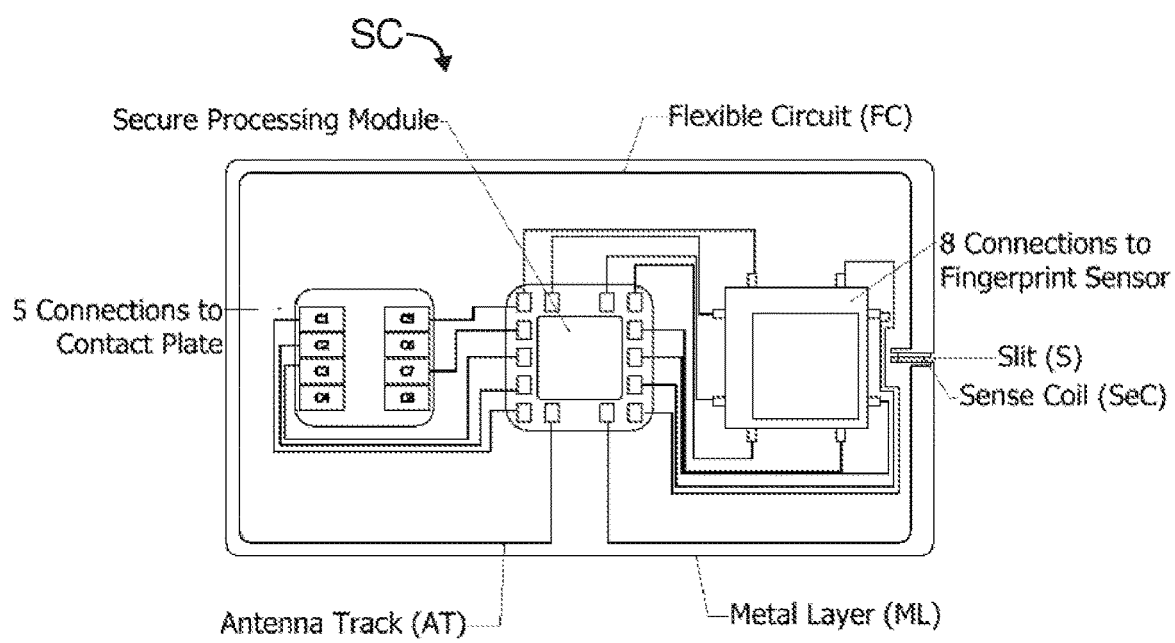

FIG. 8B (compare FIG. 3B of U.S. 62/936,519) is a schematic view of a biometric metal smartcard comprising a metal layer (ML) or metal card body (MCB), interconnected components mounted thereto, a discontinuity in the form of a slit (S) or gap (G) and a flexible circuit (FC) with a sense coil (SeC) overlapping the slit in a parallel arrangement, according to the invention.

Figure 9:
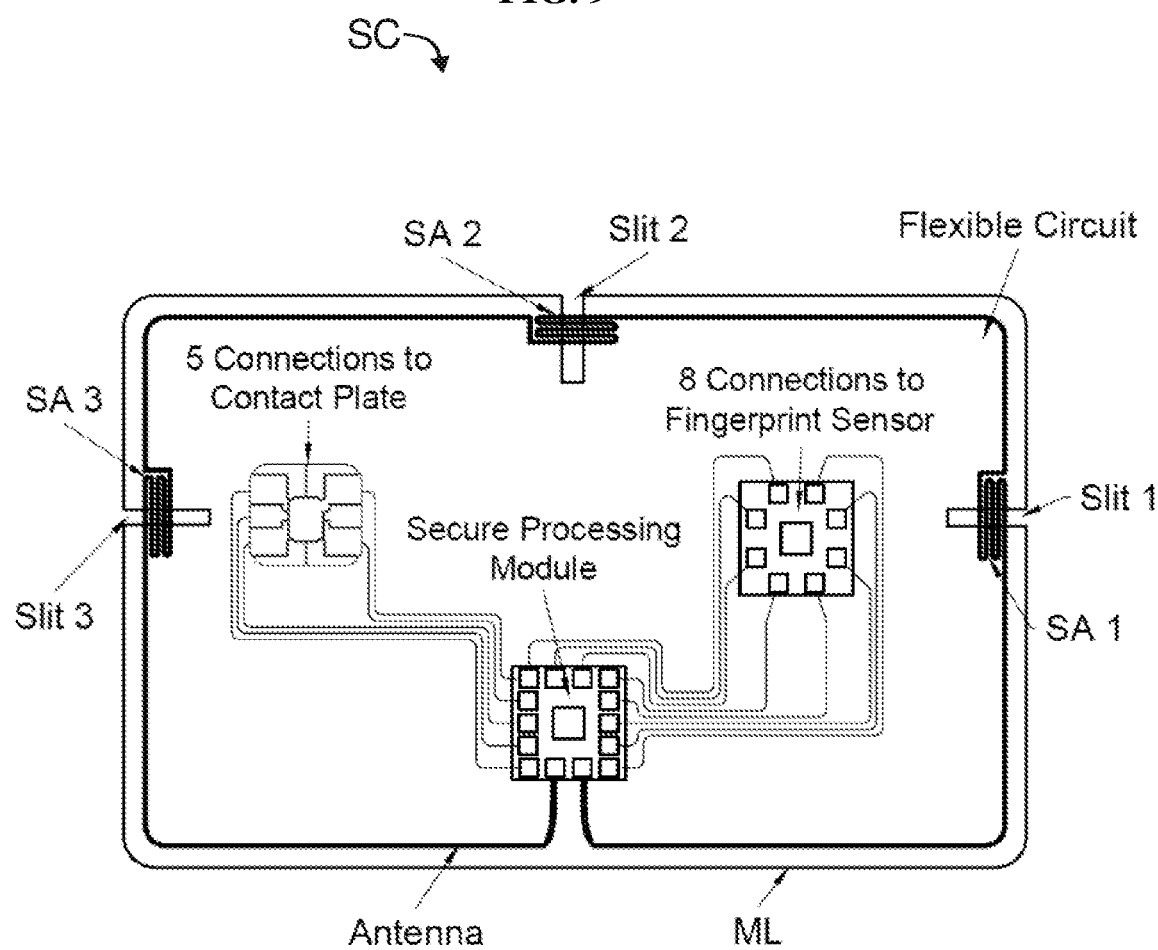

FIG. 9 (compare FIG. 4 of U.S. 62/936,519) is a schematic view of a biometric metal smartcard comprising a metal layer (ML) or metal card body (MCB), interconnected components mounted thereto, a plurality of discontinuities in the form of a slit (S) or gap (G) and a flexible circuit (FC) with sense coils (SeC) interfacing with said discontinuities, according to the invention.

Figure 10:
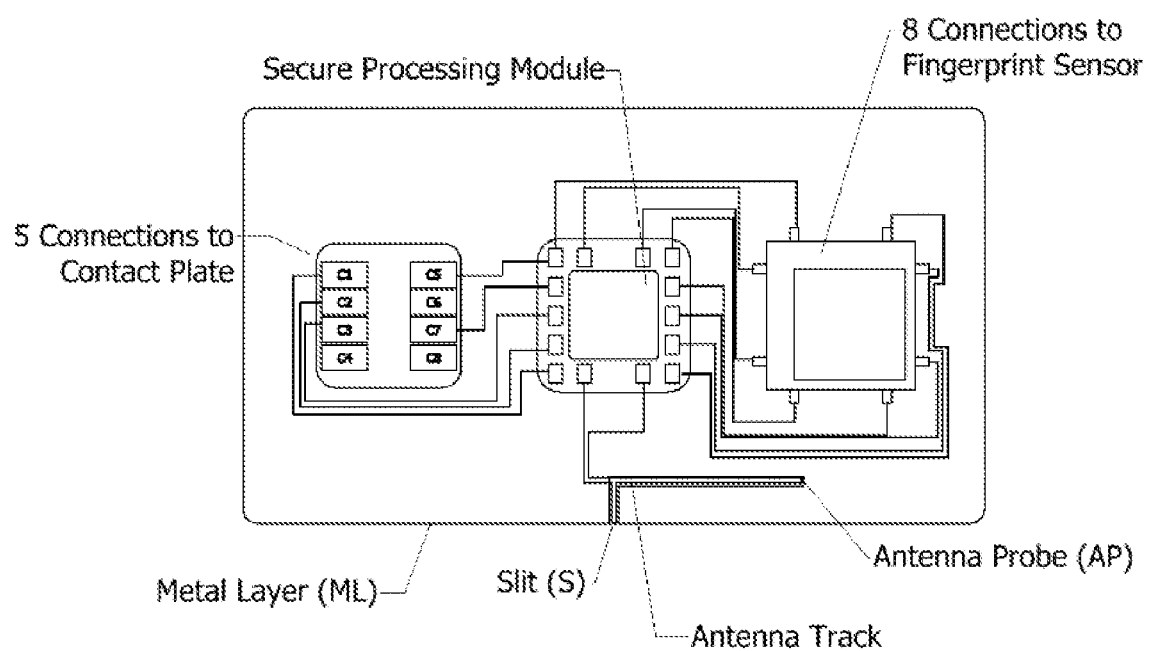

FIG. 10 (compare FIG. 5 of U.S. 62/936,519) is a schematic view of a biometric metal smartcard comprising a metal layer (ML) or metal card body (MCB), interconnected components mounted thereto, a discontinuity in the form of a slit (S) or gap (G) and a flexible circuit (FC) with a sense coil (SeC) passing through the discontinuity, according to the invention.

Figure 11:
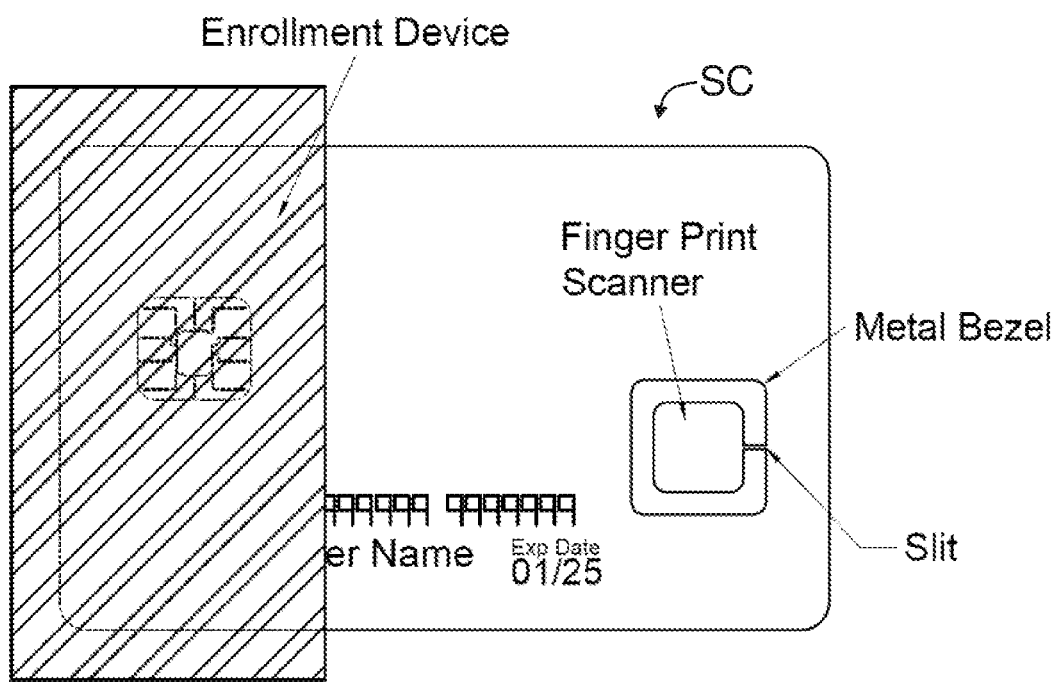

FIG. 11 (compare FIG. 6 of U.S. 62/936,519) is a diagram (plan view) of a biometric smartcard in an enrollment device comprising a fingerprint sensor surrounded on all four sides by a metal bezel with a slit to function as a coupling frame, according to the invention.

Figure 12A:
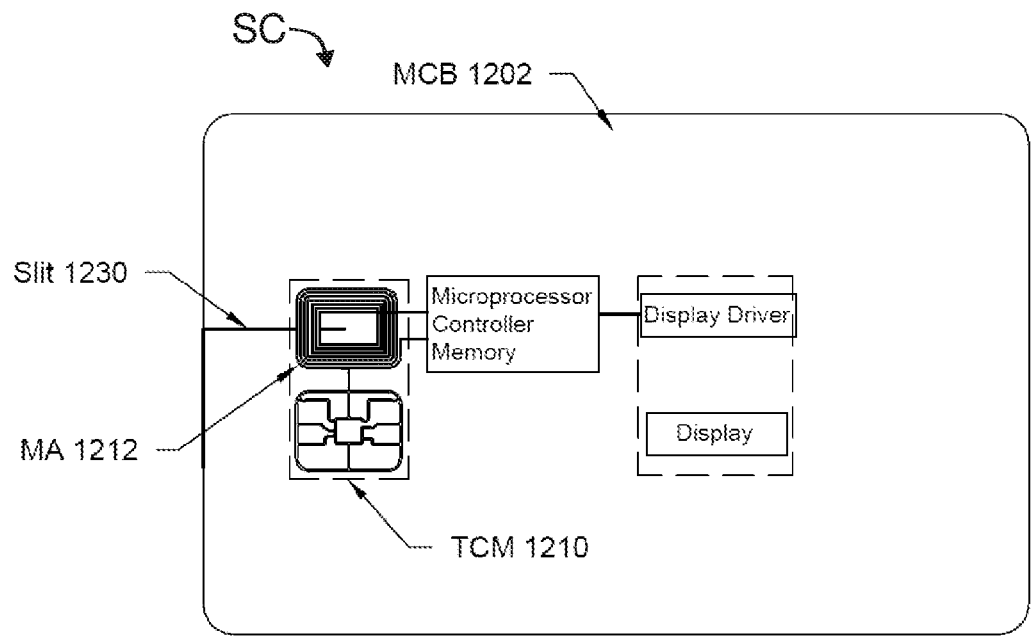

FIG. 12A (compare FIG. 5A of U.S. 63/035,670) is a diagram (plan view) of a display with a hard-wire connection, using the metal card body chassis as GND, and a module antenna (MA) of a transponder chip module (TCM) overlapping a discontinuity (S) to harvest energy, and to simultaneously power an RFID chip (IC) and a microprocessor controller memory, according to the invention. The RFID chip may be integrated into the microprocessor controller memory.

Figure 12B:
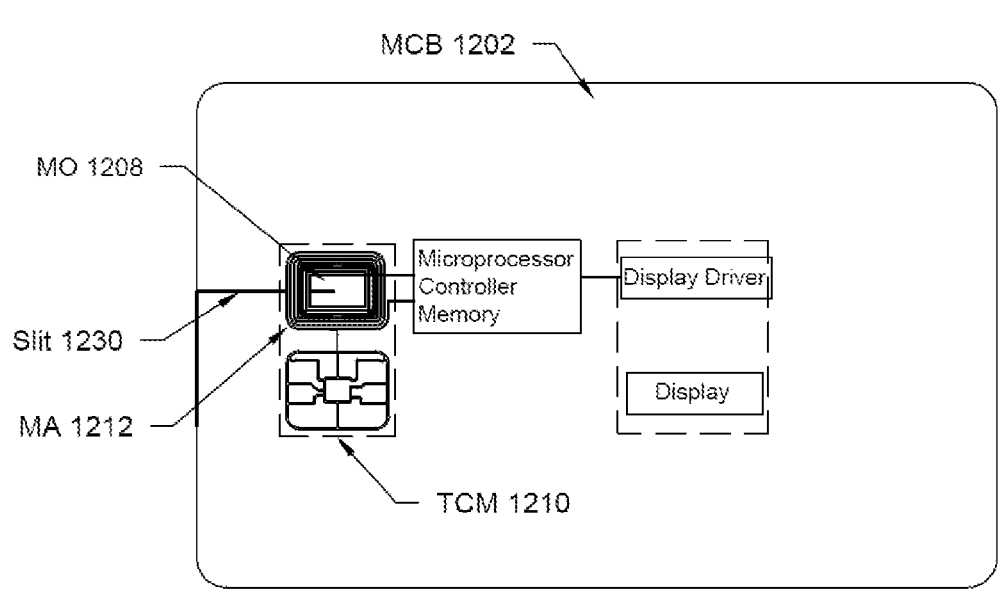

FIG. 12B (compare FIG. 5B of U.S. 63/035,670) is a diagram (plan view) of a modification to FIG. 12A illustrating a display screen in a passive display smartcard comprising a discontinuity (S) and a module opening (MO) in a metal card body (MCB), and a module antenna (MA) of a transponder chip module (TCM) overlapping the discontinuity (S) and module opening (MO), with the module antenna (MA) harvesting energy, to simultaneously power an RFID chip and a microprocessor controller, according to the invention. The RFID chip may be integrated into the microprocessor controller memory.

Figure 13A:
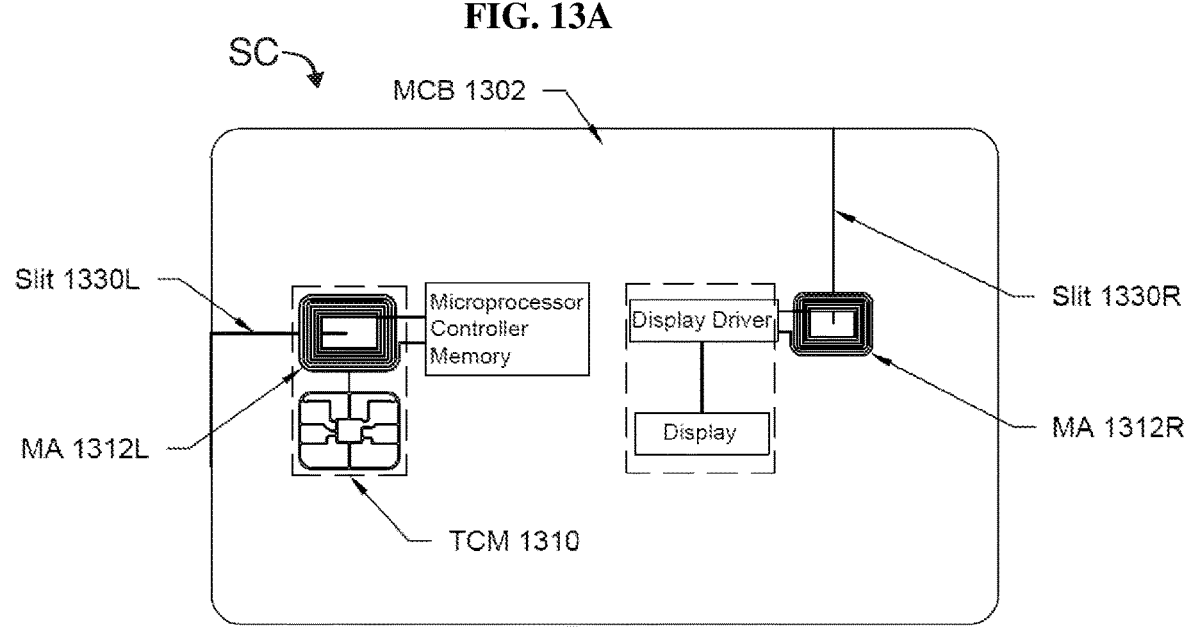

FIG. 13A (compare FIG. 6A of U.S. 63/035,670) is a diagram (plan view) of a display inductive coupled using RFID Slit Technology, and using the metal card body chassis as GND, according to the invention. A first module antenna (MA) of a transponder chip module (TCM) overlaps a first discontinuity (S) in the metal card body (MCB) and simultaneously powers an RFID chip and a microprocessor controller memory, while a second module antenna/MA) overlaps a second discontinuity (S) to power a display drive.

Figure 13B:
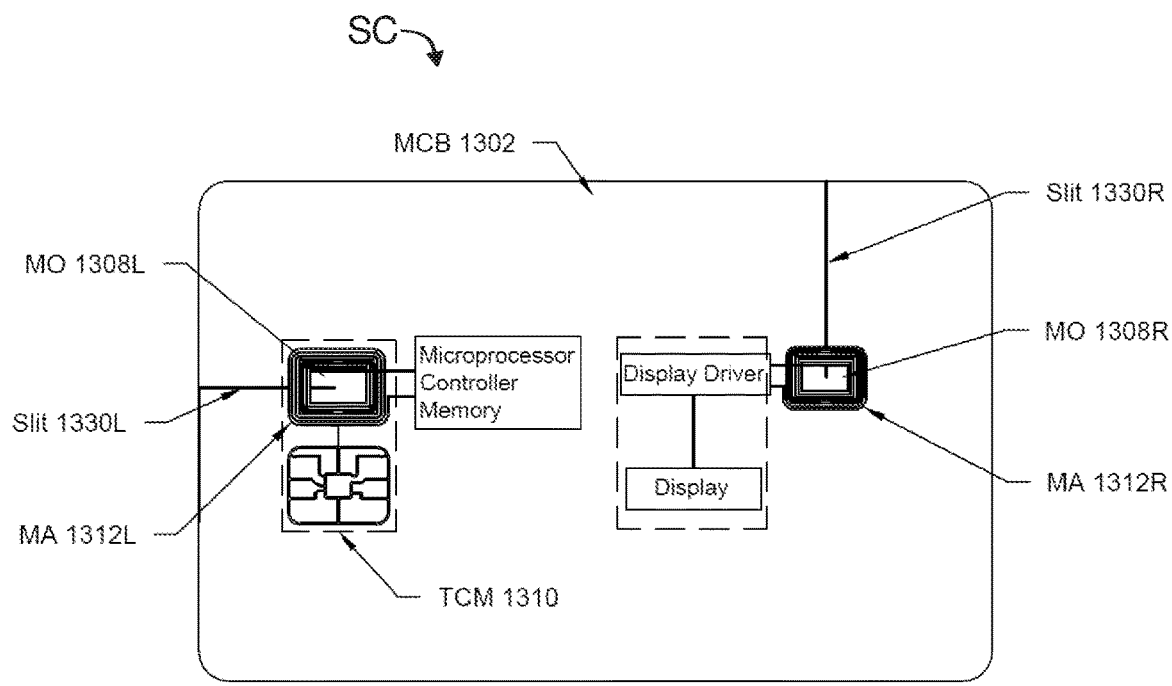

FIG. 13B (compare FIG. 6B of U.S. 63/035,670) is a diagram (plan view) of a modification to FIG. 13A comprising of a discontinuity (S) and a module opening (MO) and an additional opening in the metal layer (ML) or in each metal layer sandwiching the embedded electronic components (not shown), according to the invention. A first module antenna (MA) of a transponder chip module (TCM) overlaps a first discontinuity (S) in the metal card body (MCB) and simultaneously powers an RFID chip and a microprocessor controller memory, while a second module antenna/MA) overlaps a second discontinuity (S) to power a display drive.

DESCRIPTION

Various embodiments (or examples) may be described to illustrate teachings of the invention(s), and should be construed as illustrative rather than limiting. It should be understood that it is not intended to limit the invention(s) to these particular embodiments. It should be understood that some individual features of various embodiments may be combined in different ways than shown, with one another.

Reference herein to "one embodiment", "an embodiment", or similar formulations, may mean that a particular feature, structure, operation, or characteristic described in connection with the embodiment is included in at least one embodiment of the present invention. Some embodiments may not be explicitly designated as such ("an embodiment").

The embodiments and aspects thereof may be described and illustrated in conjunction with systems, devices and methods which are meant to be exemplary and illustrative, not limiting in scope. Specific configurations and details may be set forth in order to provide an understanding of the invention(s). However, it should be apparent to one skilled in the art that the invention(s) may be practiced without some of the specific details being presented herein. Furthermore, some well-known steps or components may be described only generally, or even omitted, for the sake of illustrative clarity. Elements referred to in the singular (e.g., "a widget") may be interpreted to include the possibility of plural instances of the element (e.g., "at least one widget"), unless explicitly otherwise stated (e.g., "one and only one widget").

In the following descriptions, some specific details may be set forth in order to provide an understanding of the invention(s) disclosed herein. It should be apparent to those skilled in the art that these invention(s) may be practiced without these specific details. Any dimensions and materials or processes set forth herein should be considered to be approximate and exemplary, unless otherwise indicated. Headings (typically underlined) may be provided as an aid to the reader, and should not be construed as limiting.

Reference may be made to disclosures of prior patents, publications and applications. Some text and drawings from those sources may be presented herein, but may be modified, edited or commented to blend more smoothly with the disclosure of the present application.

In the main hereinafter, RFID cards and electronic tags in the form of pure contactless cards, dual interface cards and electronic identity cards may be discussed as exemplary of various features and embodiments of the invention(s) disclosed herein. As will be evident, many features and embodiments may be applicable to (readily incorporated in) other forms of smartcards, such as EMV payment cards, metal composite cards, encapsulated metal cards, solid metal cards, metal veneer cards, metal hybrid cards, metal foil cards, access control cards and secure credential cards. As used herein, any one of the terms "transponder", "tag", "smartcard", "data carrier", "wearable device" and the like, may be interpreted to refer to any other of the devices similar thereto which operate under ISO 14443 or similar RFID standard.

This disclosure relates to the field of RFID-enabled metal transaction cards and, more particularly, metal transaction cards having multiple slits in different locations in a card body and using an internal flexible circuit to distribute currents collected through inductive coupling at each slit position. The flexible circuit comprises of a patch antenna and a coupling loop structure.

Metal Card Bodies without a Slit extending to a Module Opening

In all representations of the RFID slit technology in the Prior Art, the transponder chip module (TCM) comprises an RFID chip connected to a module antenna (MA) on the same substrate or module tape (MT). In all disclosures of dual interface chip cards (DI chip cards), the slit (S) always extends from a perimeter edge to a module opening (MO), without considering that the slit (S) may not need to extend to the module opening (MO) in order to operate as a coupling frame (CF).

Smartcard with Coupling Frame

FIG. 1 illustrates a smartcard (SC) which may be a metal card, composite metal card or encapsulated metal card having a slit (S) to function as a coupling frame (CF). Compare FIG. 3 of U.S. Pat. No. 9,836,684 (3## reference numerals changed to 1##).

This figure illustrates the front side of a smartcard (SC) 300 which may be a metal card having a metal layer (ML), which may constitute substantially the entire thickness of the card body (CB) 102. The card body (CB) may have a module opening (MO) 108 wherein a transponder chip module (TCM) 110 may be disposed, and a slit (S) 130 extending from the module opening (MO) to the outer perimeter of the metal layer (ML) so that the metal card body (MCB) 102 may function as a coupling frame (CF) 120. The metal layer (ML) (or card body CB, or metal card body MCB) may comprise titanium, and is provided with a slit, slot or gap in the metal to create an open loop coupling frame closely adjacent to and substantially fully surrounding the transponder chip module (TCM). The slit (S) may overlap a portion of the module antenna (MA) 112 of the transponder chip module (TCM).

From the teachings of the '684 patent, it is apparent that the slit (S) extends from a perimeter edge of the metal card body (MCB) to a module opening (MO) to accept a transponder chip module (TCM), whereby the slit may overlap a portion of the module antenna (MA) of the transponder chip module (TCM).

Module Opening without a Slit Extending Thereto

According to the invention, the slit (S) does not need to extend to the module opening (MO) to function as a coupling frame (CF), and the module antenna (MA) does not need to overlap a slit (S) to capture surface currents. According to the invention, the module antenna (MA) may need to overlap a metal edge (ME), defined above. Overlapping a metal edge is not mentioned in the Prior Art.

FIG. 2 is a diagrammatic view of an internal rear surface of a metal face transaction card (aka metal hybrid smartcard (SC)) having a slit (S) or notch (N) 230 extending right through the front face metal layer to function as a coupling frame (CF) 220, and having a recess (R) 210 in the metal to accept a flexible circuit (FC). A rear plastic backing (not shown) may be laminated thereto. Given that the slit (S) or notch (N) 230 does not extend to the module opening (MO) 208, the mechanical stability of the metal card body (MCB) 202 may be maintained.

202—metal card body (MCB)
208—module opening (MO) for a transponder chip module (not shown, compare 110)
210—recess
   the recess (for a flexible circuit) intersects (extends into area of) the module opening
230—slit (S) extending from the left edge of the MCB towards (but not reaching) the MO
220—coupling frame (CF) resulting from metal card body (MCB) with slit (S)

It may be noted that FIG. 2 resembles FIG. 5B of U.S. Pat. No. 9,836,684. However, in FIG. 2, the slit (S) does not extend to the module opening (MO). In FIG. 5B, the slit extends to the opening.

The flexible circuit (FC), such as shown in FIGS. 5A,B (below), may comprise (i) a patch antenna (PA) to the overlap the slit (S) and metal edge (ME) of the metal card body (MCB) and (ii) a coupling loop structure (CLS) with tracks to redirect the surface currents which are captured by the patch antenna (PA) to an antenna structure (AS) which overlaps the module antenna (MA) of the transponder chip module (TCM) for inductive coupling. The word patch antenna (PA) may be used interchangeably with the terms sense coil (SeC) or pick-up coil (PuC), unless the context indicates otherwise. Also, as described herein, an "antenna probe" element may be disposed within a slit, not overlapping anything (i.e., not overlapping a metal edge, etc.).

FIG. 3 is a diagrammatic view of an internal rear surface of a metal face transaction card (aka metal hybrid smartcard (SC)) which may be a metal card with a rear plastic backing having a slit (S) or notch (N) 330 on both sides of the front face metal layer extending entirely through the metal to function as a coupling frame (CF) 320 and a recess (R) 310 in the metal to accept a flexible circuit (FC).

The flexible circuit (FC) (such as shown in FIGS. 5A,B) may be provided with two patch antennae (PA) to pick up the surface currents on the perimeter edges of the metal card body (MCB) 302. The currents collected by each patch antenna (PA) from the slit locations in the metal card body (MCB), observing the polarity of the current flows, are directed via tracks in the coupling loop structure (CLS) to an antenna structure (AS) which overlaps the module antenna (MA) of the transponder chip module (TCM) not shown.

302—metal card body (MCB)
308—module opening (MO) for transponder chip module
310—recess in the front surface of the MCB, extending from left-to-right across the MCB the recess (for a flexible circuit) intersects (extends into area of) the module opening
330—slit (S) extending from the left edge of the MCB towards (but not reaching) the MO
320—coupling frame (CF) resulting from metal card body (MCB) with slit (S)

FIG. 4 is a diagrammatic view of an internal rear surface of a metal face transaction card (aka metal hybrid smartcard (SC)) which may be a metal card with a rear plastic backing having a slit (S) or notch (N) 430 on both sides of the front face metal layer with a different positional orientation to FIG. 3 to function as a coupling frame (CF) 420 and a recess (R) 410 in the metal to accept a flexible circuit (FC).

Depending on the position of the slit (S) in the metal card body (MCB) 402, relating to the polarity of the current flows, the overlapping patch antenna (PA) may have windings which run parallel, perpendicular or zigzag to the slit direction. The patch antenna (PA) may also wrap around the slit area, crossing the slit at one position only.

402—metal card body (MCB)
408—module opening (MO) for transponder chip module
410—recess in the front surface of the MCB, extending from top-to-bottom across the MCB the recess (for a flexible circuit) intersects (extends into area of) the module opening
430—slits (S) extending from the top and bottom edges of the MCB towards (but not reaching) the MO
420—coupling frame (CF) resulting from metal card body (MCB) with slits (S)

FIGS. 5A and 5B are diagrams of a flexible circuit (FC) with a patch antenna (or sense coil) to overlap a slit (S) or notch (N) in a metal card body (MCB) 502 and a coupling loop structure (CLS) with an antenna structure (AS) to overlap a module antenna (MA) in a transponder chip module (TCM), mounted into a recess (R) in the metal card body (MCB).

502—metal card body (MCB)
520—coupling frame (CF) resulting from metal card body (MCB) with slits (S)

The windings of the patch antenna (PA) or sense coil (SeC) in FIG. 5A may run parallel, perpendicular, zigzag or a combination thereof across or along the metal edges (MEs) of the slit in the metal layer (ML) or metal card body (MCB). The windings of the coupling loop structure (CLS) in the form of a frame or spiral antenna structure (AS) overlap the windings of the module antenna (MA) of the transponder chip module (TCM). For optimal performance the overlap may be 50%. In connecting all three antennae together, the current direction and polarity is respected.

Some Examples of Flexible Circuits installed in Metal Card Bodies

FIG. 6A shows a metal card body (MCB) 602 having two slits (S) 630A and 630B extending from respective two opposite (left and right) side edges of the periphery of the card body towards an interior area of the card body. An elongate flexible circuit (FC) extends across the card body, from left-to-right, and has an antenna structure at each end—Patch Antenna 1 disposed at the left end of the flexible circuit, and Patch Antenna 2 disposed at the right end of the flexible circuit. The Patch Antennae overlie the corresponding slits at the left and right sides of the card body. The metal card body with slits functions as a coupling frame (CF) 620.

In this embodiment, there are no module openings. A module antenna (MA) 612 for a transponder chip module (TCM, not shown) is illustrated, aligned with Patch Antenna 1.

Patch Antenna 1 is connected to Patch Antenna 2 via conductors on a flexible circuit (FC) substrate. A capacitor (CP) 618 may be used in the flexible circuit as a frequency tuning component to optimize RF performance. The flexible circuit containing the two Patch Antennae allows full functionality of the card across the full read/write volume.

FIG. 6B is similar to FIG. 6A and shows the flexible circuit (FC) with two patch antennae (or sense coils) as part of a coupling loop structure (CLS) with the first patch antenna (PA 1) fitting within a void (or wide slit) 690A on one (left) side of the metal card body (MCB), and the second patch antenna (PA 2) fitting within a void (or wide slit) 690B on the opposite (right) side of the metal card body (MCB).

FIG. 6C is similar to FIG. 6B and shows a flexible circuit (FC) with two patch antennae (or sense coils) as part of a coupling loop structure (CLS) with the first patch antenna (PA 1) fitting within a void (or wide slit) on one (left) side of the metal card body (MCB), and the second patch antenna (PA 2) fitting within a void (or wide slit) on the opposite (right) side of the metal card body (MCB). This view shows the module antenna (MA) 612 may be disposed within the metal void (wide slit) 690A, on the left side of the card body.

FIGS. 6A,B,C may be contrasted with what is disclosed in US 20200034578. More particularly, as disclosed therein:

FIG. 4C shows a metal layer (ML) with two module openings (MO-1, MO-2) and respective two slits (S1, S2). Compare FIG. 4A.

FIG. 4C additionally shows a coupling antenna (CPA) which may be similar to the booster antenna (BA) shown in FIG. 3, but without the peripheral card antenna (CA) component. In other words, the coupling antenna (CPA) is shown having two coupler coils (CC-1) and (CC-2) overlapping, within or in close proximity to respective two module openings (MO-1, MO-2) of the card body (CB) and coupling frame (CF). The two coupler coils (CC-1, CC-2) may both have free ends (.circle-solid.). Alternatively, the ends of the two coupler coils could be connected with one another, as illustrated by the dashed line.

In US 20200034578, there is no mention of inductive coupling with the module antenna of the transponder chip module.

FIG. 6D is a cross-sectional view of a flexible circuit (FC) disposed below a metal card body (MCB) having a recess on its rear surface for accepting the flexible circuit, and showing that a layer of ferrite may be disposed on the front of the flexible circuit or the rear of the metal card body.

Fingerprint Sensors in Smartcards

Analysis of the ridges and patterns of skin on the fingertips of an individual is highly unique, easily collectable, very measurable and usually permanent throughout a person's lifespan.

A fingerprint sensor (FS) is an electronic device used to register a digital image of the fingerprint pattern. The sensor captures the relevant fingerprint features for further processing.

A capacitive sensor generates the fingerprint image by passing a small electrical current across the surface of the finger.

Biometrics are physical or behavioral human characteristics to that can be used to digitally identify a person to grant access to systems, devices or data. Examples of these biometric identifiers are fingerprints, facial patterns, voice or typing cadence. Today, biometrics is used to unlock mobile devices, access apps and to verify payments.

As used herein, a "biometric payment card" is a credit or debit card that uses the cardholder's fingerprint to authenticate transactions.

A fingerprint sensor in a smartcard eliminates the need for a user to memorize a pin code (being twice as secure as a standard 4-digit PIN (having a false acceptance probability rate of 1/20,000 versus 1/10,000 that another person's fingerprint would match that of the enrolled/authorized user), and enables contactless payment without a cap (limit).

The contactless functionality powers the card with the energy from the payment terminal. No battery is required.

The components of a contactless biometric smartcard may include (i) a capacitive fingerprint sensor, (ii) an image extraction microprocessor, (iii) a separate payment chip with security features, (iv) an antenna to harvest energy and for data communication, and (v) an on-card LED to indicate success.

This passive smartcard may operate at the lowest ISO field strength of 1.5 A/m.

An ultra-thin low power fingerprint sensor may be touched from any angle (360-degree fingerprint recognition) with high image resolution (e.g. 508 dpi) to make payments easy. Authorization is typically less than 1 sec. Image extraction from a fingerprint sensor is performed by a low power micro-processing module (e.g. NXP SPM60).

Fingerprint templates and matching engines are stored in the secure element of the RFID-enabled microcontroller chip (NXP P60D145).

Voltage Metal Bezel on a Fingerprint Sensor

A fingerprint sensing module (FS, FSM) may comprise (among other things) an electrically conductive bezel (see FIG. 11) arranged adjacent to the sensing array to provide an electrical connection between a finger placed on the sensing surface and drive signal circuitry of the fingerprint sensing module.

The bezel may be a metal frame arranged to surround the sensor device such that a finger placed on the sensing surface also makes contact with the bezel. Thereby, a drive signal can be provided to the finger, which facilitates capacitive fingerprint measurement.

According to the invention, the metal bezel (with a slit) may be used in the manner of a coupling frame to harvest energy and drive the fingerprint sensor.

A fingerprint sensing module comprising an electrically conductive bezel may be integrated into a metal transaction card without over grounding the swing voltage driving the pixels of the fingerprint sensor.

The metal card body may be electrically isolated from the metal bezel by the application of coatings (DLC) or anodizing (oxidation) to one or both of the metal parts, to prevent contact between the active bezel drive and the metal card body.

Driving Electronic Components in Metal Containing Transaction Cards

An electronic component in an RFID-enabled metal transaction card may be powered from an antenna structure (AS) or antenna cell (AC) overlapping a single discontinuity or may be powered from a plurality of interconnected antenna structures (AS) or antenna cells (AC) at multiple locations overlapping a plurality of discontinuities. Alternatively, an antenna probe (AP) positioned in a discontinuity may be used to pick-up inner metal currents, metal edge currents and surface currents.

This disclosure also relates to the field of EMV metal cards with fingerprint biometrics, providing a simple and secure way for cardholders to authenticate their identity for in-store purchases with their fingerprint, as an alternative to PIN or signature. The EMV metal card may comprise an antenna probe mounted in a discontinuity to pick-up currents from within the discontinuity, without the necessity to overlap the discontinuity.

FIG. 7 is a schematic view of a prior art, plastic (not metal) biometric smartcard (SC) comprising an antenna (wire embedded or chemically etched) with several turns, contact pads on a module tape connected to a secure processing module with further connections thereof to a fingerprint sensor. The conventional antenna (such as a booster antenna, disposed around a peripheral area of the card) on a plastic substrate (not shown), and drives the components when in an electromagnetic field, generated by a reader or point of sale terminal.

In FIG. 7, the transponder module (with contact pads) may be illustrated on the right-hand side of the card, the fingerprint sensor (FS, FSM) may be shown on the left-hand side of the card. In some other figures (e.g., FIGS. 8A/B, 9, 10, 11), the transponder chip module (TCM) may be shown, in a more conventional manner, on the left-hand side of the card with the fingerprint sensor (FS) being illustrated on the right-hand side of the card. FIGS. 12A/B show the transponder chip module (TCM) on the left-hand side of the card, with a display module (DM) on the right-hand side of the card.

In the wiring schematic of the biometric smartcard, there are 5 connections from the secure processing module to the contact pads for physical interfacing with a point of sale terminal, 2 connections from the antenna to the secure processing module, and 8 connections from the secure processing module to the fingerprint sensor. The thickness of the sensor may be approximately 550 µm. The secure processing module may be a RFID secure microprocessor based on the NXP P60 or P71 platform.

FIG. 8A shows a biometric metal smartcard comprising a metal layer (ML) or metal card body (MCB), interconnected components mounted thereto, a single discontinuity in the form of a slit (S) or gap (G) and a flexible circuit (FC) with a sense coil (SeC) having windings running perpendicular to the slit direction. The sense coil (SeC) captures surface current flows to drive the electronic components.

The Contact Plate on the left represents the contact pads (CP) of a transponder chip module (TCM, not shown). A Fingerprint Sensor is shown on the right. A Secure Processing Module is shown, and is connected to the Contact Plate (i.e., to the TCM) and to the Fingerprint Sensor.

The Sense Coil (SeC) is disposed over (or within) a slit (S), and may be oriented perpendicular to the slit. The Sense Coil (SeC) is shown as being connected via an Antenna Track (AT) with the Secure Processing Module which may have an energy harvesting circuit (such as a bridge rectifier) incorporated therein. It should be understood that this is a schematic diagram, where some of the elements (such as the Sense Coil and the Slit) may be shown in their approximate physical position on the card body. However, the Antenna Track (AT) does not need to extend around the periphery of the card body, as illustrated. It is shown as such merely for illustrative clarity.

FIG. 8B is similar to FIG. 8A, and shows a sense coil (SeC) having its windings running parallel to the slit direction.

The illustrations of the windings running perpendicular or parallel the slit direction is merely exemplary, as the shape, form, windings (number of tracks, separation distance between tracks, track width) and crossovers of the sense coil (SeC) may be optimized to maximize the current delivery and minimize negative current flows from negative mutual inductance.

Alternatively, the biometric metal smartcard may comprise a plurality of discontinuities in the form of a slit (S) or gap (G), and a flexible circuit (FC) with sense coils (SeCs) interfacing with said discontinuities. Each sense coil picks-up current flows at each slit, observing the polarity of the current flow to maximize the accumulation of current presented to and driving the master component device such as the secure processing module.

FIG. 9 is a schematic view of a biometric metal smartcard comprising a metal layer (ML) or metal card body (MCB), interconnected components mounted thereto, a plurality of discontinuities in the form of a slit (S) or gap (G) and a flexible circuit (FC) with sense coils (SeC, here labeled "SA") interfacing with said discontinuities. Each sense coil picks-up current flows at each slit, observing the polarity of the current flow to maximize the accumulation of current presented to the driving component such as the secure processing module.

FIG. 9 shows only a few (3) slits and corresponding sense coils (SeC, SA) disposed around the periphery of the metal card body, for harvesting energy. In practice, there may be many more slits and sense coils disposed around the periphery for harvesting energy. And, since none of these slits need to extend to a module opening, the mechanical integrity of the card may better be preserved (i.e., not compromised in the manner resulting from a slit extending to a module opening.

FIG. 10 is a schematic view of a biometric metal smartcard comprising a metal layer (ML) or metal card body (MCB), interconnected components mounted thereto, a discontinuity in the form of a slit (S) or gap (G) and a flexible circuit (FC) with a sense coil (SeC) passing through the discontinuity. A micro-sense coil interfaces with the current flows from within the discontinuity. Equally, the micro-sense coil can pick-up current flows on the surface of the metal layer (ML) or metal card body (MCB) for maximum power delivery to the components. The micro-sense coil may also be referred to as an antenna probe (AP). The antenna probe (AP) may be physically connected to a metal strip ($1^{st}$ electrode) positioned within the discontinuity and to the metal card body ($2^{nd}$ Electrode).

Distinguishing from FIG. 7

Note that in FIGS. 8A/B, 9, 10, a sense coil (SeC) or the like (SA, AP) is used to harvest energy from one or more slits extending into the peripheral edge of a metal card body. In FIGS. 8A/B, 9, the sense coils (SeC) or the like (SA) are illustrated as being connected with the Secure Processing Module, which can also function as an energy harvesting circuit, which may be as simple as a bridge rectifier.

Although the connections of the sense coils (SeC) or the like (SA) are shown extending around the periphery of the card body, this should NOT be interpreted as a physical representation of the location of the connections, and should NOT be confused with a booster antenna component such as is illustrated in FIG. 7. En contraire, the connections between the sense coils (SeC) or the like (SA) may be implemented on a flexible circuit (FC) which may be located entirely in an interior area of the card body, such as is illustrated in FIGS. 5B and 6.

The purpose of the sense coils (SeC) or the like (SA, AP) is to harvest energy from one or more slits extending into the peripheral edge of a metal card body, and to distribute the energy to the various modules (transponder chip module, fingerprint module, display module, etc.) in the card.

Distinguishing over US 2020/0034578 ('578):

As mentioned above, a wireless connection may be established between two electronic modules (M1, M2) disposed in module openings (MO-1, MO-2) of a smartcard so that the two modules may communicate (signals, data) with each other. The connection may be implemented by a booster antenna (BA) having two coupler coils (CC-1, CC-2) disposed close to the two modules, and connected with one another. [Abstract]

The present invention also contemplates establishing a wireless connection between two electronic modules. This may be done with some antenna structures (comparable to the coupler coils of '578), but without a booster antenna.

The antenna structures of the present invention are used to harvest energy. In '578, energy harvesting is done by the booster antenna. "The booster antenna may also harvest energy from an external device such as a card reader, POS terminal, or a smartphone." [Abstract]

In FIG. 1 of '578, The proximity of the coupler coil (CC) with the module antenna (MA) allows the chip module to harvest energy from the external device (or reader), such as the aforementioned POS terminal, and also allows for data to be passed back-and-forth between the chip module (CM) and the external device. [0109]

In FIG. 2 of '578, two coupler coils are shown, each aligned with a respective one of two modules. See also FIG. 3 (schematic representation). The coupler coil component CC-1 may be disposed at a location in the card body (CB) aligned with the chip module (CM, M1). The coupler coil component CC-2 may be disposed at a location in the card body (CB) aligned with the display module (DM, M1). See also FIG. 3. [0116] The chip module (CM, M1) may comprise a module antenna (MA-1) for coupling with a first of the coupler coils (CC-1), for harvesting energy, as was described with respect to FIG. 1, from an external device such as a POS terminal. [0117] The display module (DM, M2) may comprise a module antenna (MA-2) for coupling with a second of the coupler coils (CC-2), for harvesting energy from the POS terminal. [0118] Bear in mind that this is all done with a booster antenna (BA) having a card antenna (CA) component/portion extending around the periphery of the card, to harvest energy from the external source (e.g., POS terminal). Energy may be harvested by each of the chip module (CM, M1) and display module (DM, M2) via the booster antenna (BA) and respective coupler coils (CC-1, CC-2). Both of the modules (M1, M2) may harvest energy from an external source (POS terminal). One of the two modules may harvest energy, and provide energy to the other module, in which case only one of the modules would need an energy harvesting circuit. [0123]

FIG. 4 of '578, shows a smart card (SC), which may have a metal layer (ML) which may be a metal card body (CB, MCB) formed with an opening (MO-1) for a transponder chip module (TCM, CM, M1), a slit (S1) extending from the opening to an edge (left, as viewed) of the metal card body, turning the card body into a coupling frame (CF). The opening MO-1 may be at the position prescribed by the ISO standard (near the left edge of the card body (CB) for the transponder chip module (TCM). [0146] Another opening (MO-2) is formed on an opposite (right) side of the metal layer (ML) or metal card body (MCB) and has a slit (S2) extending from the opening to the edge (right, as viewed) of the card body/coupling frame (CB/CF). A display module (DM, M2) may be disposed in the opening (MO-2). [0147]

FIG. 4C of '578 shows a metal layer (ML) with two module openings (MO-1, MO-2) and respective two slits (S1, S2). Compare FIG. 4A. [0159] FIG. 4C additionally shows a coupling antenna (CPA) which may similar to the booster antenna (BA) shown in FIG. 3, but without the peripheral card antenna (CA) component. In other words, the coupling antenna (CPA) is shown having two coupler coils (CC-1) and (CC-2) overlapping, within or in close proximity to respective two module openings (MO-1, MO-2) of the card body (CB) and coupling frame (CF). [0160]

In contrast with '578, which is somewhat vague about the interaction of the coupler coils and the slits, the sense coils (SeC) or the like (SA) of the present invention are specifically designed and implemented to perform a primary function of harvesting energy, and may not be involved with communicating signals between the two modules (e.g., fingerprint sensor and transponder chip module), the latter function (communicating and coordinating communication between modules) being implemented and managed largely (if not entirely) by the Secure Processing Module. However, the following may be noted:

- The coupling antenna (CPA) may serve to harvest energy from the second module opening (MO-2) and increase power delivery to the transponder chip module (TCM) in the first module opening (MO-1), via inductive coupling.
- When there is no module disposed in the second module opening (MO-2), the coupling antenna's purpose is to increase energy harvesting, without the need for data transfer.
- The second module opening (MO-2) and its slit (S2) may be located at a different position on the card, such as along a top or bottom edge thereof. The module opening (MO-2) may be omitted, leaving just the slit (S2). The coupling antenna (CPA) may traverse the slits (S1, S2). A portion of the coupling antenna (CPA), more particularly of the coupling coils (CC-1, CC-2) may be disposed adjacent (such as parallel) to the slits (S1, S2).

FIG. 11 is a diagram of a biometric smartcard in an enrollment device comprising a fingerprint sensor (scanner) surrounded on all four sides (i.e., framed) by a metal bezel with has a slit so that it may function as a coupling frame. The active bezel drive with slit may capture or harvest the radiation from the electromagnetic field to voltage drive the pixel on the sensor when a finger is placed on the device.

Passive RFID-enabled Metal Transaction Cards with Dynamic CVV Display

This disclosure further relates to the field of passive EMV metal cards with a dynamic display refreshed at each contact or contactless event. The metal card body acts a ground for interconnection between the electronic components and for data communication transmission.

FIG. 12A illustrates a display screen in a passive display smartcard (SC) with a hard-wired connection to a microcontroller (Microprocessor Controller, Memory), incorporating a discontinuity (S) in a metal layer (ML) to concentrate surface eddy current density. The chip module comprises contact pads and a micro-coil (i.e., a small module antenna MA) connected to a dual interface microcontroller (microprocessor). There is no module opening in this embodiment. The module antenna overlaps the slit.

1202—metal card body (MCB)
1210—transponder chip module (TCM)
1212—module antenna (MA)
1230—slit (S)

The module antenna (MA) 1212 of the transponder chip module (TCM) 1210 overlaps the slit (S) 1230 in the metal card body (MCB) 1202. The transponder chip module (TCM) may house the RFID chip (IC) and the microprocessor controller memory (2 chip solution) or the electronic devices are assembled separately, with the module antenna (MA) powering the RFID chip (IC) and the microprocessor controller memory simultaneously. In a one chip solution, the RFID chip and microcontroller are one device, a dual interface microcontroller (microprocessor).

A DCVV component (or Display Module, DM) is illustrated (in dashed lines), which comprises (i) a display which is connected (e.g., by a hard-wired connection) to (ii) a display driver unit. This may all be a single (one) device having both (integrated) display and driver). The microprocessor is connected to the display driver via wired connections (e.g., on the flexible circuit FC).

The chip module (CM) is placed with the module antenna (MA) 1212 overlapping the discontinuity (S) 1230 in the in the metal card body (MCB) 1202. When the card is placed in the reader field, power is delivered to the microprocessor and display driver. A command/script on the microprocessor to securely generate a new CVV number is transmitted to the display driver via wire connections, using the metal card body (MCB) "chassis" as GND. The display driver may then update the display unit to show the new CVV number.

FIG. 12B is similar to FIG. 12A and illustrates a display screen in a passive display smartcard comprising a discontinuity (S) and a module opening (MO) 1208 in the metal card body (MCB) 1202 to concentrate surface eddy current density around the micro coil connected to a dual interface microcontroller (microprocessor). There is a module opening in this embodiment. The module antenna overlaps the slit.

1202—metal card body (MCB)
1208—module opening (MO)
1210—transponder chip module (TCM)
1212—module antenna (MA)
1230—slit (S)

FIGS. 13A/B are similar to FIGS. 12A/B, with the addition of a module antenna (MA) 1312R and a slit (S) 1330R on the right-hand (as viewed) side of the metal card body (MCB) 1302. The slit (S) on the left (compare 1230 of FIG.

12) is labeled 1330L, and the module antenna (MA) on the left (compare 1212 of FIG. 12) is labeled 1312L.

FIG. 13A illustrates a display screen and a transponder chip module with inductive coupling elements, incorporating two discontinuities (S), 1330L and 1330R, in the metal card body (MCB) 1302 or in each metal layer sandwiching the embedded electronic components (not shown). The chip module (TCM) 1310 consists of contact pads and a rear micro-coil connected to a dual interface microcontroller (microprocessor). There is no module opening in this embodiment.

1302—metal card body (MCB)
1310—transponder chip module (TCM)
1312L—module antenna (MA) on left (L) side of card
1312R—module antenna (MA) on right (R) side of card
1330L—slit (S) on left (L) side of card, extending from module antenna (MA) 1312L area to the left peripheral edge of card
1330R—slit (S) on right (R) side of card, extending from module antenna MA) 1312R area to the top peripheral edge of card The DCVV component contains a display driver and a display unit with an antenna coil or module antenna (MA) 1312R (flexible circuit) connected to the driver (may also be one device with the integrated display and driver). The microprocessor is connected to the display driver via inductive coupling.

Communication between the microprocessor and the display is implemented via inductive coupling at a predetermined frequency. Inductive coupling is therefore used to power the components while at the same time acting as a communication channel between the components via the elements of the discontinuities in the metal layer or layers.

The electronic components may also be implanted in the metal card body (MCB) 1302 after the metal layers have been laminated together.

The microprocessor is powered by the module antenna (MA) 1312L of the transponder chip module (TCM) 1310 which picks up surface currents around the discontinuity (S) 1330L.

FIG. 13B is a modification of FIG. 13A comprising two discontinuities (S), 1330L and 1330R, and a module opening (MO) in the metal card body (MCB) 1302 or in each metal layer sandwiching the embedded electronic components (not shown). An additional opening is provided in the metal layer (ML) or layers (MLs) which overlaps the antenna coil (AC) or module antenna (MA) 1312R on the flexible circuit (FC) which delivers power to the display driver. There is a module opening (MO) for the transponder chip module (TCM) in this embodiment.

1302—metal card body (MCB)
1308—module opening (MO)
1310—transponder chip module (TCM)
1312L—module antenna (MA) on left (L) side of card
1312R—module antenna (MA) on right (R) side of card
1330L—slit (S) on left (L) side of card, extending from module antenna (MA) 1312L area to the left peripheral edge of card
1330R—slit (S) on right (R) side of card, extending from module antenna MA) 1312R area to the top peripheral edge of card In a metal face transaction card having a metal front and a plastic backing, the CVV display may be assembled to the rear plastic layer, while the energy harvesting may stem from the current flows collected around a discontinuity with or without an opening in the metal layer. The plastic backing may comprise a "conventional" rear plastic subassembly comprising a rear printed layer and a rear overlay layer which may be joined an adhesive layer, to a rear side of the metal card body. A magnetic stripe and a signature panel may be disposed on the rear plastic subassembly.

The microprocessor is powered by the module antenna (MA) 1312L of the transponder chip module (TCM) 1310 which picks up surface currents around the discontinuity (S) 1330L and module opening (MO) 1308L.

CNC Milling

Typically, cards may be manufactured (laid up and laminated) in sheet form, each sheet having a plurality of cards, such as in a 5×5 array, and CNC (computer numerical control) machining may be used to singulate (separate) the finished cards from the sheet. Resulting burrs, particularly in the metal layers, may cause defects, such as electrical shorting of the slit. Hence, CNC machining of metal core, metal face or solid metal smartcards may be performed using cryogenic milling, such as in an environment of frozen carbon dioxide or liquid nitrogen.

Some Additional Comments

Some of the card embodiments disclosed herein may have two metal layers, separated by a dielectric coating or an insulating layer, rather than a single metal layer. The two metal layers may comprise different materials and may have different thicknesses than one another. For example, one of the metal layer may be stainless steel while the other metal layer may be titanium. In this manner, the "drop acoustics" of the metal card body may be improved, in that the card, when dropped or tapped (edgewise) on a hard surface, sounds like a solid metal card (making a ringing or tinkling sound), rather than like a plastic card (making a "thud").

Generally, in order for the smartcard to be "RFID-enabled" (able to interact "contactlessly"), each of the one or more metal layers should have a slit, or micro-slit. When there are two (or more) metal layers with slits in the stack-up, the slits in the metal layers should be offset from one another.

Some Generic Characteristics

The smartcards described herein may have the following generic characteristics:

The card body may have dimensions similar to those of a credit card. ID-1 of the ISO/IEC 7810 standard defines cards as generally rectangular, measuring nominally 85.60 by 53.98 millimeters (3.37 in×2.13 in).

A chip module (RFID, contact type, or dual interface) may be implanted in a recess (cavity, opening) in the card body. The recess may be a stepped recess having a first (upper, P1 portion) having a cavity depth of 250 µm, and a second (lower, P2 portion) having a cavity depth of (maximum) 600 µm.

A contact-only or dual interface chip module will have contact pads exposed at a front surface of the card body.

ISO 7816 specifies minimum and maximum thickness dimensions of a card body: Min 0.68 mm (680 µm) to Max 0.84 mm (840 µm) or Min 0.027 inch to Max 0.033 inch Generally, any dimensions set forth herein are approximate, and materials set forth herein are intended to be exemplary. Conventional abbreviations such as "cm" for centimeter", "mm" for millimeter, "µm" for micron, and "nm" for nanometer may be used.

The concept of modifying a metal element of an RFID-enabled device such as a smartcard to have a slit (S) to function as a coupling frame (CF) may be applied to other products which may have an antenna module (AM) or transponder chip module (TCM) integrated therewith, such as watches, wearable devices, and the like.

Some of the features of some of the embodiments of RFID-enabled smartcards may be applicable to other RFID-enabled devices, such as smartcards having a different form factor (e.g., size), ID-000 ("mini-SIM" format of subscriber identity modules), keyfobs, payment objects, and non-secure NFC/RFID devices in any form factor The RFID-enabled cards (and other devices) disclosed herein may be passive devices, not having a battery and harvesting power from an external contactless reader (ISO 14443). However, some of the teachings presented herein may find applicability with cards having self-contained power sources, such as small batteries (lithium-ion batteries with high areal capacity electrodes) or supercapacitors.

The transponder chip modules (TCM) disclosed herein may be contactless only, or dual-interface (contact and contactless) modules.

In their various embodiments, the invention(s) described herein may relate to payment smartcards (metal, plastic or a combination thereof), electronic credentials, identity cards, loyalty cards, access control cards, and the like.

While the invention(s) may have been described with respect to a limited number of embodiments, these should not be construed as limitations on the scope of the invention(s), but rather as examples of some of the embodiments of the invention(s). Those skilled in the art may envision other possible variations, modifications, and implementations that are also within the scope of the invention(s), and claims, based on the disclosure(s) set forth herein.

What is claimed is:

1. A smartcard (SC) comprising:
one or more modules (TCM, DM, FS, FSM), each having a module antenna (MA); and
a metal layer (ML) or metal card body (MCB) having one or more module openings (MO) for accepting the one or more modules, and further having one or more slits (S) or notches (N) extending from a periphery of the layer towards an interior position of the metal layer;
wherein:
at least one of the slits or notches do not extend to the one or more module openings (MO); and
further comprising:
a coupling structure (CLS, CS) comprising (i) one or more antenna structures (AS, PA, SeC, AP) (PA) overlying or fitting into at least one of the slits or notches, and (ii) a coupling loop structure (CLS) overlying the module antenna (MA) of at least one of the modules.

2. The smartcard of claim 1, wherein:
the coupling structure (CS) resides on a flexible circuit (FC).

3. The smartcard of claim 2, further comprising:
a recess (R) formed in the metal layer (ML) around an area of the slit and module opening (MO).

4. The smartcard of claim 3, wherein:
the flexible circuit fits into the recess.

5. The smartcard of claim 2, further comprising:
a ferrite layer disposed between the flexible circuit (FC) and the metal layer (ML) to offset the effects of electromagnetic attenuation caused by the metal layer (ML).

6. The smartcard of claim 5, wherein:
the ferrite layer is disposed on either the flexible circuit or on the metal layer.

7. The smartcard of claim 5, wherein the rear plastic subassembly comprises:
a rear printed layer and a rear overlay layer.

8. The smartcard of claim 1, further comprising:
a rear plastic subassembly joined, via an adhesive layer, to a rear side of the metal layer or metal card body.

9. The smartcard of claim 1, further comprising:
a Secure Processing Module capable of performing energy harvesting; and
the antenna structures are connected with the secure processing module.

10. A smartcard (SC), comprising:
a metal layer (ML) or metal card body (MCB) having (i) a discontinuity in the form of a slit (S) or gap (G); and (ii) a sense coil (SeC) disposed at a location of the discontinuity;
wherein the sense coil captures surface currents at the edge or within the discontinuity to power at least one electronic component comprising at least one of a fingerprint sensor (FS) module and a transponder chip module (TCM).

11. The smartcard of claim 10, wherein one of the modules is a fingerprint sensor, and further comprising:
a metal bezel for the fingerprint sensor;
wherein the metal bezel has a slit to enable it to function as a coupling frame to drive the fingerprint sensor.

12. The smartcard of claim 10, wherein:
there are a plurality of discontinuities around the metal layer (ML) or metal card body (MCB); and
there are a corresponding plurality of sense coils located at each of the discontinuities to maximize the delivery of power to the electronic components by using a sense coil (SeC) at each discontinuity to capture current flows.

13. A smartcard (SC) comprising:
a metal card body (MCB) comprising one or more metal layers (ML); and
an electronic system capable of performing security authentication;
wherein the electronic system comprises:
a display screen;
a display driver control module for driving the display screen;
a microprocessor controller connected to the display driver control module; and
a communication module connected to and working with a dual interface chip module to perform the security authentication;
further comprising:
at least one antenna circuit for inductive coupling to power the electronic system;
wherein the least one flexible antenna circuit is coupled to at least one discontinuity in the metal card body.

14. The smartcard of claim 13, wherein:
the metal card body functions as a ground plane.

15. A smartcard (SC) comprising:
a metal card body (MCB) comprising one or more metal layers (ML); and
an electronic system capable of performing security authentication;
wherein the electronic system comprises:
a display screen;
a display driver control module for driving the display screen;
a microprocessor controller connected to the display driver control module; and
a communication module connected to and working with a dual interface chip module to perform the security authentication;

wherein:
the metal card body has (i) a front metal face (metal layer) and (ii) a rear metal face (metal layer) separated from the front metal face by a dielectric layer of material.

16. The smartcard of claim 15, wherein:
the front and rear metal faces each act as an electrode.

17. The smartcard of claim 15, wherein:
the front and rear metal faces each act as a conductive chassis for power and data communication.

* * * * *